(12) United States Patent
Sun et al.

(10) Patent No.: US 11,474,279 B2
(45) Date of Patent: Oct. 18, 2022

(54) WEATHER-RELATED OVERHEAD DISTRIBUTION LINE FAILURES ONLINE FORECASTING

(71) Applicant: Mitsubishi Electric Research Laboratories, Inc., Cambridge, MA (US)

(72) Inventors: Hongbo Sun, Lexington, MA (US); Shengyi Wang, Philadelphia, PA (US); Kyeong Jin Kim, Lexington, MA (US); Jianlin Guo, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 79 days.

(21) Appl. No.: 17/159,782

(22) Filed: Jan. 27, 2021

(65) Prior Publication Data

US 2022/0236451 A1 Jul. 28, 2022

(51) Int. Cl.
*G01W 1/10* (2006.01)
*G06N 20/00* (2019.01)

(52) U.S. Cl.
CPC .............. *G01W 1/10* (2013.01); *G06N 20/00* (2019.01)

(58) Field of Classification Search
CPC ................................ G01W 1/10; G06N 20/00
See application file for complete search history.

(56) References Cited

U.S. PATENT DOCUMENTS

| 10,445,673 | B1* | 10/2019 | Hofmann | G06Q 10/06315 |
| 2009/0024543 | A1* | 1/2009 | Horowitz | G06Q 30/0283 705/400 |
| 2009/0259581 | A1* | 10/2009 | Horowitz | G06Q 40/08 705/35 |
| 2010/0131202 | A1* | 5/2010 | Dannevik | G01W 1/00 702/181 |
| 2013/0024342 | A1* | 1/2013 | Horowitz | G06Q 40/08 705/35 |
| 2014/0324351 | A1* | 10/2014 | Dannevik | G08B 21/10 702/3 |
| 2021/0157312 | A1* | 5/2021 | Cella | H04L 1/18 |

* cited by examiner

*Primary Examiner* — Raymond L Nimox
(74) *Attorney, Agent, or Firm* — Gennadiy Vinokur; Hironori Tsukamoto

(57) ABSTRACT

A system for a region including a processor to receive data including weather and component data. Generate a dataset for the region to identify weather events and a plurality of model forcings converted into tabular form. A machine learning (ML) model for each model forcing for each component uses dataset. Iteratively, for each weather event: identify for each component a corresponding model forcing with weather variables. Generate an output value for ML model corresponding to the identified components to the set of weather variables and update ML model. Receive observed data over time periods of an impending weather (IW) event. Iteratively, for each time period: identify, for each component a corresponding model forcing with weather variables and update ML model. Generate for the updated ML model, an output value predicting a component status as a failed or not failed for the time period.

20 Claims, 24 Drawing Sheets

PARAMETERS SETTING FOR WIND-RELATIVE DATA GENERATION

| | Level 1 [0,35) mph | Level 2 [35,45) mph | Level 3 [45,80] mph |
|---|---|---|---|
| $p_r(W)$ | 0.9 | 0.085 | 0.015 |
| $\mu_{X|W}$ | 17.5 | 40 | 62.5 |
| $\sigma_{X|W}$ | 2.5 | 2 | 1 |

Table 1

FIG. 7A

PARAMETERS SETTING FOR LIGHTNING-RELATIVE DATA GENERATION

| | Level 1 0 kA | Level 2 (0,3.5) kA | Level 3 [3.5,6.5) kA | Level 4 [6.5,9.5) kA | Level 5 [9.5,16] kA |
|---|---|---|---|---|---|
| $p_r(L)$ | 0.855 | 0.024 | 0.063 | 0.051 | 0.007 |
| $\mu_{Z|L}$ | 0 | 1.75 | 5 | 8 | 12.75 |
| $\sigma_{Z|L}$ | 0.001 | 0.8 | 0.5 | 0.25 | 0.1 |

Table 2

FIG. 7B

WEATHER-RELATED OVERHEAD DISTRIBUTION LINE FAILURES ONLINE FORECASTING

FIELD

The present disclosure relates generally to electric power systems, and more particularly to online failure forecasting algorithms for components including power distribution lines that dynamically update a forecasting model utilizing real-time reported outage data.

BACKGROUND

Electric power grids are one of the most critical infrastructures to today societies, for example transportation, water supply, school, city halls, and airports all rely on the supply of electricity. Wherein the power system infrastructure to deliver power includes power lines, transformers and other devices for power generation, power transmission, and power delivery. Unfortunately, the increased frequency, duration, and intensity of extreme weather events pose severe threats to overhead distribution lines for power grids, resulting in wide-area power outages primarily affecting in low-voltage and mid-voltage power distribution grid that contributes to majorities of the outages. For example, in the United States in August and September of 2017, experienced 3 separate hurricanes Harvey, Irma and Maria hit, that resulted in a total of about 7.5 million customers in Texas and Florida without electricity. The staggering cost of power system outages and the impacts on personal safety has resulted in a critical need to build resilience in power systems, specially in view of today's aging and stressed power distribution grids. One effective way to increase the operational resilience of power distribution grids is to achieve a fast and accurate estimation or prediction for outages occurring in the grids.

Some outage prediction methods for electric power distribution systems can include predicting a total number of line outages, or total time of outage for a specific area within a specific time interval. However, these outage prediction methods face serious technical challenges when attempting to build outage prediction models. For example, the first challenge can be not having the data available to make the predictions. A second challenge is that in order to predict individual overhead distribution line outages as example, there needs to be data that can be used to derive an individual failure model for each distribution line. For example, using a logistic regression-based method based on events on historical days. However, most of the days the outage status for these overhead distribution lines are labeled as "in service", and there exists a serious imbalance in the overhead distribution line service status.

Another challenge to overcome is that of model updating. Most outage prediction models are derived based on past knowledge or historical data. However, in reality, the past knowledge is not sufficient evidence to support a current decision or prediction. For example, at least one reason is that most of weather conditions can be difficult to predict and/or may happen infrequently, especially for some extreme weather events, and there lacks enough outage data to be used for outage prediction models. Further, the distribution of outage data is not always homogeneous. The inherent uncertainties of weather forecasting and individual difference (e.g., vegetation environment, trimming, aging, etc.) could change the integrity in any historical outage data.

Power outage analysis conventionally relies on customer phone calls made to the utility company in the event of a power outage as the main information source for such analysis. This process can be quite slow because many customers may not call to report an outage, and those who do report an outage may wait a relatively long period of time to report the outage, often assuming a neighboring customer will call in their stead.

When a customer contacts the utility to report an outage, a repair crew is then dispatched to determine the deficient grid element, performing fault reparation and ultimately service restoration. Without the benefit of details concerning the extend of damage and locations of the damage causing the outage, the repair crew may not be able to be certain if the outage is a single location outage or an outage to multiple locations. However, repairs have not been implemented until after a customer experiences an outage and has taken the steps to contact the utility. Then, as noted above, the customer waits without power until a repair crew is dispatched, the cause of the outage is determined and power restored, thereby leading to a degraded quality of service and increasing customer dissatisfaction.

There are some outage or failure prediction methods for overhead distribution lines for electric power systems. For example, US 2014/025,7913 A1 method predicts an outage status for an overhead distribution line using a failure rate model. The failure rate model, models the number of times an event occurs in an interval of time or space using historical data. By using a statistics approach (such as generalized liner regression models), or machine learning techniques (such as support vector machine approach) based on the historical outage samples. However, there are many problems with the US 2014/025,7913 A1 method including a lack of available data to make an accurate prediction. To predict individual line outages, a method needs to derive an individual failure model for each distribution line, which can be by using a logistic regression-based method based on events on historical days. However, the most outage status reporting for distribution lines by power grid systems are labeled as "in service", and there exists a serious imbalance in reporting of actual distribution line service status, which with the data used in the US 2014/025,7913 A1 method. Also, outage data for overhead distribution lines are not always homogeneous, as in the US 2014/025,7913 A1 method. For example, there are inherent uncertainties of weather forecasting and individual distribution line differences (i.e., vegetation environment, aging, etc.) that can change the belief in historical outage data, as with the data used in the US 2014/025,7913 A1 method.

Although existing failure prediction methods can solve some specific outage prediction problems, they do not solve online failure forecasting problems. Accordingly, there is need for online failure forecasting methods directed to overhead distribution lines for restoration of power distribution system which includes dynamic updating for a forecasting model utilizing real-time reported outage data.

SUMMARY

The present disclosure relates generally to electric power systems, and more particularly to online failure forecasting algorithms for components including power distribution lines that dynamically update a forecasting model utilizing real-time reported outage data.

Embodiments of the present disclosure include evaluation approaches analyzing impacts of weather events on overhead distribution lines or power line outage status in electric power distribution systems. Some embodiments include online outage status prediction for overhead distribution lines which are the most vulnerable components in distribution systems. Historical data of past weather events such as Hurricanes or other severe events, i.e. mixed snow/rain events, tropical cyclones with winds from 39-73 mph, thunderstorms, snow events, etc., are collected and can be used in the failure forecasting modeling.

At least one realization of the embodiments of the present disclosure includes representing weather conditions in a tabular form to assists in formulating the failure forecasting problem. This can assist in identifying a relationship between two weather variables, i.e., wind gust speeds and lighting stroke currents, or some other two or more variables, that are converts each weather variable domain (minimum & maximum values) into tabular form. Basically, the minimum & maximum values are divided into a range of a set of cells in table format, and each cell in the set represents a unique climate variation of the relationship between the two weather variables. Then, each cell is compared to a threshold of a specific amount of wind gust speed to an amount of lighting stroke currents, to identify a grouping of cells meeting the threshold that accurately represent weather conditions scenarios in a specific area within a region overhead distribution lines may be located. If the region is divided into a grid like arrangement of cells, and cells meeting the threshold will be adjoined with other like cells and when displayed, a specific area comprising a group of cells accurately represent the weather conditions scenarios. Some benefits of representing weather variables in tabular form can include reducing an amount of weather condition scenarios from an entire region to a specific grouping of cells, which allows for not having to incorporate forecasting accuracy techniques, when compared to conventional methods using individual values (min/max) associated with the entire region.

Another realization is that only using historical outage data in the forecasting prediction model is not enough evidence to support real-time or current in-time decisions for power grid operators when predicting failures of power distribution lines. This is because Historical data rarely is directed to extreme weather events, lacks outage data for predicting component failure, and is not reliable. At least one solution to this problem can be reformulating the failure forecasting problem as an online sequential decision-making problem, in which an independent failure forecasting model is used for each tabular cell, i.e. each failure forecaster in the problem attempts to solve multiple independent Bernoulli Bandit problems.

The embodiments of the present disclosure include the failure forecaster prediction that predicts a component status precisely upon receiving forecasted or observed weather conditions. The observed data is data received via a communication network or wired connection, that can include weather data from a local network of weather stations, third party weather forecasting or some other weather-related entity. The observed data includes component data from sensors associated with the components in communication with a Supervisory Control and Data Acquisition (SCADA) system of the power grid system or an electrical utility company, that monitors, and relays information associated with the components, i.e. power line status and other infrastructure status. For example, Remote Terminal Units (RTUs) can connect to the sensors, convert sensor signals to digital data and send digital data to a system of the SCADA system which can be connected to the communication network, which communicates to the component failure prediction system. Most control actions of the SCADA system can be performed by the RTUs or by programmable logic controllers (PLCs). The PLC can control some processes, such that at the RTU or PLC levels can gather data from other systems including equipment status reports which are communicated to the SCADA system via the communication network.

The prediction can be achieved by choosing either predicting a component status as in-service, or as outage, and each action relates to a probability for prediction correctness that can be modeled by a Bernoulli distribution. The Bernoulli bandit problem is to choose an action among multiple independent and competing actions, and choosing an action that receives a reward, and the reward is associated with a probability with Bernoulli distribution. A goal for a multi-armed bandit problem is to use best strategy to choose the action that maximize an expected reward function. By utilizing the strategies provided by multi-armed bandit problem, the failure forecasting can be solved to achieve highest long-term accuracy for predicting component failure.

For example, parameters of the failure forecasting models for each weather range combination can be initially determined by using the outputs of forecasting model for historical weather events fallen into the corresponding ranges and updated using outputs of forecasting model for impeding weather. The failure forecasting can be treated as an online learning process for a multiple round repeated game. Each round, a prediction is first made, then an observation is obtained to reveal the true outcome, and at last a corresponding reward or loss is determined based on the accuracy of the prediction. The aim is to maximize the reward, or minimize the loss, which is defined based on the cumulative reward/loss and the cumulative reward/loss of the best prediction strategy. Some reasons this is utilized is because during experimentation it is found that using online sequential decision-making, the outage status for each component can be predicted directly. Meanwhile, through online updating the prediction model, the prediction can incorporate the impacts of existing pre-conditions (such as age, wear-out conditions) and reflect the real-time changes of surrounding conditions (such as tree fallen) easily.

A next step for some embodiment's addresses minimizing impacts of unknown inherent uncertainties on the failure forecasting model accuracy. Those uncertainties may arise weather forecasting and individual difference (e.g., vegetation environment, trimming, aging, etc.). The uncertainty for weather forecasting is partially mitigated by presenting weather conditions by ranges instead of values. The uncertainties from individual differences are handled by selecting an appropriate online learning frameworks for failure forecasting. Through learning process, the framework with stronger learning capabilities can pick up the impacts of unknown inherent uncertainties quickly by updating the forecasting model with the accuracy reported for latest predictions.

For example, two types of learning frameworks can be incorporated into designing a desired failure forecaster, one is based on a maximum likelihood estimation, and the other is based on maximum a posteriori estimation. The maximum likelihood based learning framework estimates the parameters of Bernouli probability distribution, i.e. the mean of distribution by maximizing an action value function defined as the expected reward of failure prediction, so that under the assumed statistical model the observed data is most probable. The maximum likelihood based learning framework is a greedy algorithm, and it may converge to a sub-optimal solution. In order to overcome suboptimality, a ε-green algorithm can be used by choosing the action randomly between two actions with a probability of ε, and choosing the action to maximize the expected reward with a probability of (1−ε). Other variation for maximum likelihood estimation that can be used for failure forecasting is an Upper Confidence Bounds (UCB) algorithm that always select the greediest action to maximize the upper confidence bound defined as the expected reward plus an item favoring actions with a strong potential to have an optimal value. The maximum a posteriori based learning framework for failure forecasting estimates the parameters of Bernouli probability distribution under conditions that a prior distribution using Beta distribution is given.

The two types of learning frameworks are designed to adjust online model parameters using received reported outage data, in order to mitigate the impact of unknown inherent uncertainties on failure forecasting model accuracy. The learning framework implement two tasks, one is performing the component status prediction based on probability distribution model of prediction correctness, and the other is updating the parameters of probability distribution model using latest prediction and real-time reported status for the component. The learning framework is selected by a trade-off between computation burden and estimation accuracy. The parameters can be stored in a database; therefore, the updating of model can be done by assessing stored parameters and updating solely with the latest prediction and corresponding status report.

Another embodiment of the present disclosure includes a component failure prediction system for components including overhead distribution lines located in a predetermined region. Some examples of failures of overhead distribution lines or power line failures can include line segment (i.e. wire) broken, pole fallen/broken, short circuits online segments, line switch misfunction, and short circuits on fed transformers. The predetermined region is a service area by a power distribution system and contains a set of components related to overhead distribution lines. A hardware or electronic processor can be used to access data, including given weather variables related to wind gust speeds and lightning stroke currents corresponding to a model forcing (also referred as "a set of weather drivers"), and historical data that includes weather and component data, such as weather events corresponding to component outages for the predetermined region, from data storage. The weather can include data including one or a combination of: seasonal data; classifications of impending weather events as one of snow, ice, mixed snow and rain, rain/flood, wind, thunderstorm/lightning, ambient air temperature, wildfire, hurricane, severe weather ratings, severe storm ratings, other mixed events, etc. The component can include data for each component including one or a combination of: age; material type; designated type and design; mounting and support equipment; electrical equipment; vegetation rating; tree limb trimming rating; leaf rating; installation and maintenance logs; severe weather exposure logs; vegetation and tree growth ratings around overhead lines. Wherein the historical weather data and the historical component data that include weather events corresponding to component outages for the predetermined region can be used to define model forcing intensity groups using variables of historical weather events, and configure for machine learning (ML) model for each model forcing intensity group. Furthermore, a set of parameters can be generated specific to an impending weather event information for the predetermined location and can include location, time of year, etc., such that the parameters can include seasonal data for that season; classifications of snow, ice, rain, mixed snow and rain, wind, lightning, ambient air temperature, vegetation, land use, land terrain, etc. The parameters of the IW event can be used for resource allocations, component repairing and service restoration. The hardware processor of the embodiment of the present disclosure can implement some steps, including:

A step that defines model forcing intensity groups using variables of historical weather events, and configures a machine learning (ML) model for each model forcing intensity group;

A step that retrieves a weather event via historical data, identifies a model forcing intensity group of the event, generates an estimated output value using the ML model corresponding to the group, and updates the ML model using estimated output value and historical component data, and iterating sequentially, for each weather event;

A step that receives continuous real-time observed data over multiple time periods from a communication network of the impeding weather (IW) event, and iteratively, for each time period;

A step that identifies, via the observed weather data, the model forcing intensity group of the IW event;

A step that updates the ML model for the group using a latest predicted output value, and observed component data;

A step that generates for the updated ML model, an updated output value predicting a component failure or no component failure for each component for the time period.

Aspects of the present disclosure includes receiving real-time reported outage data through a communication network controlled a centralized distribution control system of the power grid, or a local communication device located around the component under review. The effectiveness of algorithms with different action selection strategies can be evaluated using a set of weather event samples generated by simulation or collected from historical data, in which the prediction accuracy can be measured using an accuracy metric for all samples and a F1-score metric for distinguishing between positive and negative samples, i.e. the binary outage status. The failure forecasting model can be first trained using historical data, then be used for real-time applications, along continued to update with latest prediction and reported data.

Practical Applications

The present embodiments solve the technical problem of deciding in advance the number of repair crews either locally or not locally, needed along with organizing preparations for work crews and equipment for outages. Being better prepared allows the utility to restore the power faster and cost efficiently and instills confidence to their users knowing that their utility determining the storm preparedness decisions on real quantitative analysis rather than through making assumptions using historical data. The features of the embodiments of the present disclosure arise by using historical data and even real-time observed data by reformulating the failure forecasting problem as an online sequential decision-making problem, in which an independent failure forecasting model is used for each tabular cell, i.e. each failure forecaster in the problem attempts to solve multiple independent Bernoulli Bandit problems.

For example, the embodiments of the present disclosure identify a relationship between two weather variables (wind gust speeds and lighting stroke currents) from conventional historical and real-time formatted data and converts each weather variable domain (minimum & maximum values)

into tabular form. Basically, the minimum & maximum values are divided into a range of a set of cells in table format, and each cell in the set represents a unique climate variation of the relationship between the two weather variables. Then, each cell is compared to a threshold of a specific amount of wind gust speed to an amount of lighting stroke currents, to identify a grouping of cells that accurately represent weather conditions scenarios. By representing weather variables in tabular form contributes to producing the technical effect of reducing an amount of weather condition scenarios from an entire region to a specific grouping of cells, which allows for serving the technical purpose including not having to incorporate forecasting accuracy techniques, when compared to conventional methods using individual values (min/max) associated with the entire region. More importantly the embodiments of the present disclosure result in more accurate forecasting over conventional methods based in part by dividing conventional historical and real-time data from value formatted data into range format into a grid like arrangement of cells. The cells meeting the threshold will be adjoined with other like cells and when displayed, a specific area comprising a group of cells accurately represent the weather conditions scenarios. The resulting outputted value predicting a component status as a failed or not failed for the time period by the embodiments of the present disclosure are used to solve the technical problem of determining in advance a number of repair crews either locally or not locally, needed, as well as used in organizing preparations for work crews and equipment for outages. By allowing utility's to be better prepare results in restoring the power faster and increases cost efficiently. The reason this technical problem needs to be address is because severe weather causes major damage to power distribution networks that causes power outages. Managing risks of a weather hazard, for utility's engineers and emergency preparedness staff need to receive accurate information using time series of weather forecasts, for predicted outages, that would be used to make decisions, which is what the embodiments of the present disclosure provide.

Experimentation

What was learned from experimentation is that having represented weather conditions in tabular form can provide multiple advantages for failure forecasting. The first advantage is simplifying the complexity of failure forecasting model by limiting the weather condition variations into a set of sections within the domain that corresponds to a unique climate variation of weather within a range. The second advantage is ensuring that there is an enough data for determining the failure forecasting model.

When developing the failure forecasting models of the present disclosure several realizations where realized from experimentation, one realization is representing weather conditions in tabular form is not only important but a unique feature. This is because the complexity of the relationship between component failure and weather conditions are further defined or narrowed within a specific range, i.e. unique climate variation of weather within a range, to only a set of sections within the domain. By significantly reducing the complexity of the relationship between component failure and weather conditions to the set of sections within the domain, when compared with conventional methods having a much wider range, a more simplified model can be used for failure forecasting, to satisfy the computation speed requirements for online application that can meet today's forecasting demands within the weather forecasting industry.

Continuing with experimentation, the impacts of weather conditions are evaluated by ranges when using tabular representation instead of the conventional approach that uses individual weather condition values. For example, conventional power line outage forecasting methods analyze impacts of weather events for a wider range, when weather conditions are formatted/represented as individual values. Converting weather conditions into ranges per the tabular representation of the present embodiments is a more simplified model to be able to relate component failure with weather conditions. Some reasons the tabular representation is more simplified is that we can ignore the weather condition differences for weather events that belong to the same ranges defined by the tabular representation.

In contrast to using values by conventional forecasting methods, some aspects why converting values to ranges is very different than conventional approaches using values can be in the construct of how the forecasting problem is being solved. As discussed earlier, without having accurate historical data, it is difficult for outage predication models to predict outages for overhead distribution lines. One surprising benefit later realized from representing weather conditions in tabular is a possibility of reducing an amount of weather condition scenarios and even requirements for forecasting accuracy, as noted above. Some reasons why it is significant for reducing an amount of weather condition scenarios in a failure forecasting model is because that when the weather conditions are represented as tabular form, we ignore the differences of weather events that belonging to a same tabular cell, so there is no need for detailed values for each weather variable as in conventional approaches. By doing so, power utilities may reduce waiting time for more accurate and higher resolution weather observation and trigger their preparation and dispatch jobs much earlier for disaster restoration and recovery when component failure information available. Another benefit for using tabular representation, by representing weather conditions as ranges instead of values, it is much easier to collect sufficient number of historical weather events to configure and calibrate the component failure models. Therefore, it also reduces the difficulties for data preparation and model validation for online failure forecasting.

Further testing included formulating the failure forecasting problem as an online sequential decision-making problem in which an independent failure forecasting model is used for each tabular cell, i.e. combination of variation ranges of weather variables. What was learned is that the online sequential decision-making approach of the present disclosure is very different than some experimental test failure forecasting approaches. For example, first test approach included predicting a total number of line outages, and total time of outage for a specific area within a specific time interval using historical weather data. However, this first test approach merely provided the statistical value predictions for total outages and total durations but did not pinout the location and time for outage occurrence which is critical for electrical power distribution system to conduct its outage isolation, restoration and component repairing jobs. Finally, after experimenting using the first test approach, testing stopped due to not being able to obtain failure forecasting that met the minimum goals of the present disclosure. For example, the first test approach failed to identify which component is in outage, and when the outage is occurring. Following the first test, a second test approach was developed to be more fully vetted, which included incorporating different statistical approaches, in order to attain a more successful failure forecasting prediction.

The second test experimental approach included using a failure rate model, also termed a cladded fragility curve, used to provide a damage assessment of power equipment from weather events. This test model assumed a number of times of outages using historical outage sample data, followed by using a Poisson distribution, which modeled the number times the outage events occurred within an interval of a time or space. In order to fully explore all possible solutions to developing a successful failure forecasting approach, several different statistical approaches including generalized liner regression models, machine learning techniques, such as support vector machine approaches based on the historical outage samples, were incorporated with the failure rate model.

However, what was later learned from testing the first and the second test approaches is that building outage prediction models face serious technical challenges. The first challenge was that there was no data available in terms of developing a failure forecasting model(s) to meet the goals of the present disclosure. For instance, when predicting an individual line outage, where one needs to derive an individual failure model for each distribution line, for example, an approach could include using a logistic regression-based method based on events on historical days. However, the recording practices of today's reporting of historical outages by power system companies and third parties, records the status of power distribution lines during outages as having an outage status labeled as "in service", wherein there exists a serious imbalance in recording a power distribution line service status. The second challenged learned from experimentation is the first and second and multiple other test approaches tested failed to include any aspect of updating the failure forecasting models. Such that these test approaches tested, and even conventional failure forecasting approaches or conventional failure prediction models were all derived based on past knowledge or historical outage samples.

What was realized from this experimentation is that using only past knowledge, i.e. historical outage data, is not sufficient evidence to support real-time or current in-time decisions, when predicting failures of power distribution lines or other components for power grids or power companies for today's power industry. Firstly, historical recorded weather conditions are rarely directed for extreme weather events, and the historical recorded weather lacks enough outage data in terms of predicting power line failures or other components of power grid systems. Secondly, the distribution of outage data is not always homogeneous or reliable. The inherent uncertainties of weather forecasting and individual differences (e.g., vegetation environment, aging, etc.) changes the beliefs in historical outage data. Thus, by formulating the failure forecasting problem as an online sequential decision-making problem, the failure forecasting can not only learn from past knowledge and situations, and update with the impacts of real-time weather data accordingly.

Upon formulating the failure forecasting problem as the online sequential decision-making problem, a set of test experiments included reformulating the failure forecasting problem so each failure forecaster in the problem attempts to solve multiple independent Bernoulli Bandit problems. A desired failure forecaster is to predict the component status precisely upon receiving forecasted or observed weather conditions. The prediction can be achieved by choosing either predicting the component status as in-service, or predicting the component status as outage, and each action relates to a probability for prediction correctness that can be modeled by a Bernoulli distribution. Thus, the failure forecasting can be regarded as a Bernoulli two-armed Bandit problem. A Bernoulli multi-armed bandit problem is to choose an action among multiple independent and competing actions, and choosing an action receives a reward, and the reward is associated with a probability with Bernoulli distribution. The goal for a multi-armed bandit problem is to use best strategy to choose the action that maximize an expected reward function. By utilizing the strategies provided by multi-armed bandit problem, the failure forecasting can be solved to achieve highest long-term accuracy for prediction.

According to an embodiment of the present disclosure, a component prediction system for a region including a component prediction processor configured to receive, from data storage, data including weather and component data for regions. Generate a dataset for the region to identify weather events with components locations, and each weather event includes parameters, and sets of weather variables converted into tabular form. Generate sets of weather drivers or sets of model weather drivers, and each set of weather drivers include a given set of weather variables. Configure a machine learning (ML) model for each set of weather drivers for each component in the region using the dataset. Iteratively, for each weather event in the region: identify for each component a corresponding set of weather drivers with weather variables including wind gust speeds and lightning stroke currents. Generate an output value for the ML model corresponding to the identified components to the set of weather variables. Update the ML model with the output value and with the component data for the weather event. Receive real-time observed data over time periods via a communication network of an impending weather (IW) event in the region. Iteratively, for each time period: identify, for each component a corresponding set of weather drivers with weather variables including wind gust speeds and lightning stroke currents. Update the ML model that corresponds the identified components to the sets of weather variables using a last executed iteration predicted output value for the component, and the observed data of the IW event. Generate for the updated ML model, an output value predicting a component status as a failed or not failed for the time period.

According to another embodiment of the present disclosure, a method for component prediction method for components in a region, including accessing data including weather and component data for regions. Generate a dataset for the region to identify weather events with components locations, each weather event includes parameters, and sets of weather variables converted into tabular form representing grids of weather cells of the region. Generating sets of weather drivers, each set of weather drivers includes a given set of weather variables. Configuring a machine learning (ML) model for each set of weather drivers for each component in the region using the dataset, and iteratively, for each weather event in the region. Identifying for each component a corresponding set of weather drivers with weather variables including wind gust speeds and lightning stroke currents. Generate an output value for the ML model corresponding to the identified components to the set of weather variables and update the ML model with the output value and with the component data for the weather event. Receiving real-time observed data over time periods of an impending weather (IW) event in the region, and iteratively, for each time period. Identifying, for each component a corresponding set of weather drivers with weather variables including wind gust speeds and lightning stroke currents.

Update the ML model that corresponds the identified components to the sets of weather variables using a last executed iteration predicted output value for the component, and the observed data of the IW event. Generating for the updated ML model, an output value predicting a component status as a failed or not failed for the time period.

According to another embodiment of the present disclosure, a method for computer program product for predicting an overhead power line status of a power grid system in a region, including one or more computer-readable storage mediums. Program instructions, stored on at least one of the one or more computer-readable storage mediums, to: (a) receive, from data storage, data including weather and component data for regions, and generate a dataset for the region to identify weather events with components locations, each weather event includes parameters, and sets of weather variables converted into tabular form representing grids of weather cells of the region and for each grid, each weather cell represents a unique climate variation of a relationship between the weather variables in the set of weather variables; (b) generate sets of weather drivers, each set of weather drivers include a given set of weather variables, and configure a machine learning (ML) model for each set of weather drivers for each component in the region using the dataset, and iteratively, for each weather event in the region: (c) identify for each component a corresponding set of weather drivers with weather variables including wind gust speeds and lightning stroke currents, and (d) generate an output value for the ML model corresponding to the identified components to the set of weather variables, and update the ML model with the output value and with the component data for the weather event. Program instructions, stored on at least one of the one or more computer-readable storage mediums, to: (a) receive real-time observed data over time periods via a communication network of an impending weather (IW) event in the region, and iteratively, for each time period; (b) identify, from the observed data, the corresponding component and model forcing group of the IW event; (c) identify, for each component a corresponding set of weather drivers with weather variables including wind gust speeds and lightning stroke currents, and update the ML model that corresponds the identified components to the sets of weather variables using a last executed iteration predicted output value for the component, and the observed data of the IW event; and (d) generate for the updated ML model, an output value predicting a component status as a failed or not failed for the time period.

According to another embodiment of the present disclosure, a method for prediction system for components in a region, including a prediction processor configured to receive from a memory weather and component data for regions. Generate a dataset for the region to identify parameters for weather events with components locations. Generate sets of weather drivers, each set of weather drivers includes a given set of weather variables converted into tabular form representing grids of weather cells configured to accurately represent weather conditions scenarios in the region. Configure a machine learning (ML) model for each set of weather drivers for each component using the dataset, and iteratively. For each weather event: (a) identify for each component a corresponding set of weather drivers with weather variables, and generate an output value for the ML model corresponding to the identified components to the set of weather variables, and update the ML model with the output value and with the component data for the weather event; (b) receive real-time observed data over time periods via a communication network of an impending weather (IW) event in the region, and iteratively, for each time period; (c) identify, for each component a corresponding set of weather drivers with weather variables, and update the ML model corresponding to the identified components to the sets of weather variables using a last executed iteration predicted output value for the component, and the observed data of the IW event, and generate for the updated ML model, an output value predicting a component status as a failed or not failed for the time period.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 7A is a table illustrating parameters settings for wind-relative data generation, according to embodiments of the present disclosure;

FIG. 7B is a table illustrating parameters settings for lightning-relative data generation, according to embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to providing systems and methods for online failure forecasting for components in power distribution systems.

Figure 1A:
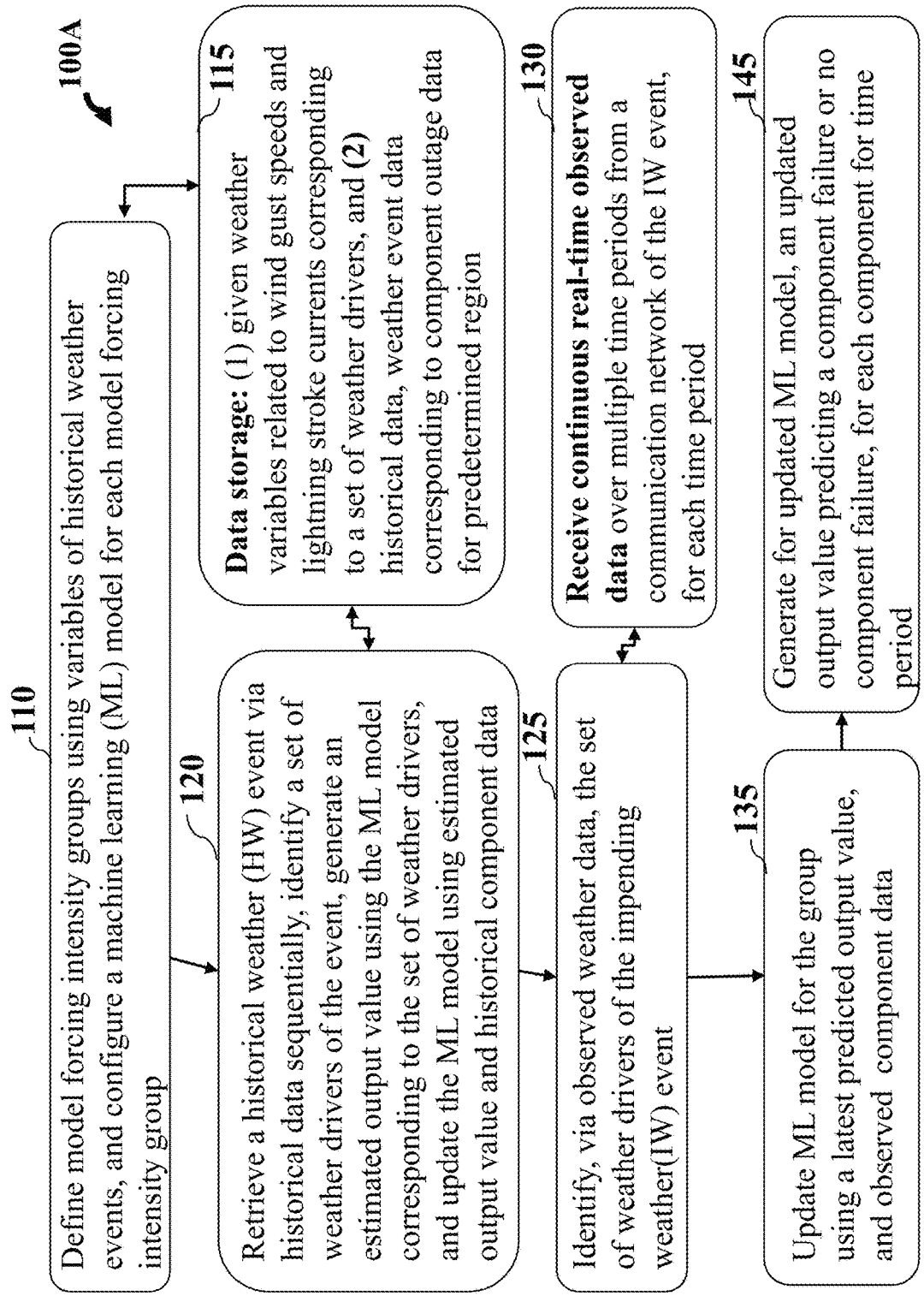
FIG. 1A is a block diagram illustrating a component failure prediction method for components such as overhead lines in a power distribution system located in a predetermined region, according to embodiments of the present disclosure.

FIG. 1A is a block diagram illustrating a failure forecasting prediction method 100A for components such as overhead lines in a power distribution system located in a predetermined region, according to embodiments of the present disclosure. Step 110 includes accessing data in step 115, the data includes given weather variables related to wind gust speeds and lightning stroke currents corresponding to a model forcing (also referred as "a set of weather drivers"), and historical data that includes weather event data corresponding to component outage data for the predetermined region. Continuing with step 110, defining model forcing intensity (FI) group with variables of historical weather events, and configure a machine learning (ML) model for each FI group.

Step 120 of FIG. 1A includes retrieving a historical weather (HW) event, from the historical data access from step 115, sequentially, identifying a FI group for the event, generate an estimated output value using the ML model corresponding to the FI group, and update the ML model using the estimated output value and historical component data.

Step 125 of FIG. 1A includes receiving continuous real-time observed data from step 130 over multiple time periods from a communication network of an impending weather (IW) event, for each time period. Step 125 continues by identifying, from the observed weather data, the FI group for the IW event.

Step 135 of FIG. 1A includes updating the ML model with a last executed iteration predicted output value and observed component data from step 130.

Step 145 of FIG. 1A includes generating for updated ML model, an updated output value predicting a component failure or no component failure, for each component for time period.

Figure 1B:
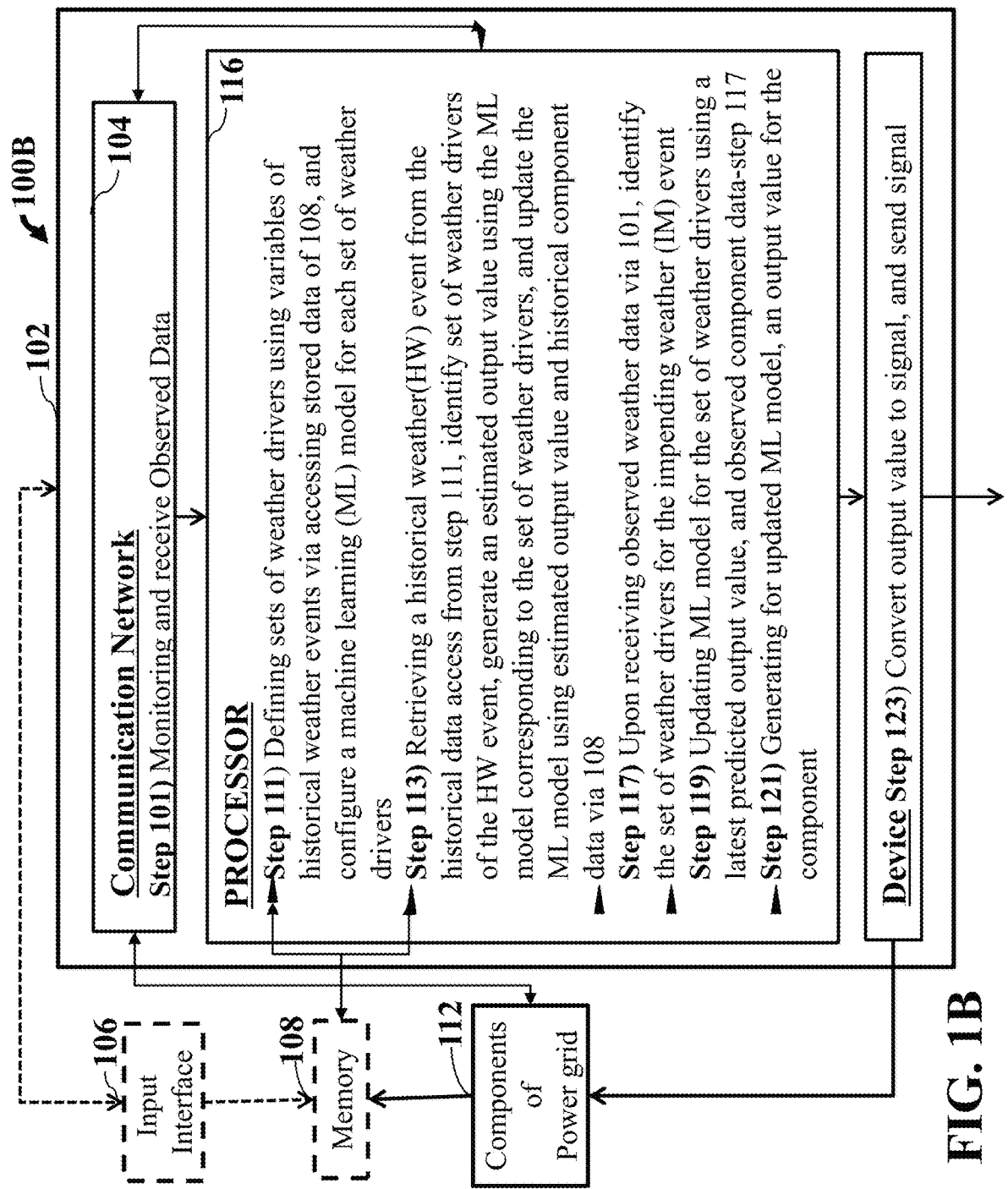
FIG. 1B is a block diagram illustrating a component failure prediction system similar to the method of FIG. 1A, configured with some components, according to embodiments of the present disclosure.

FIG. 1B is a block diagram illustrating a component failure prediction system similar to the method of FIG. 1A, configured with some components, according to embodiments of the present disclosure. One or more computers 102 are communication with an input interface 106, a memory 108, a communication network 104, one or more processors 116, and a device 123. The computer 102 is connected to components 112, i.e., overhead lines of a power grid or power distribution system. It is contemplated the computer 102 may be incorporated with components of FIG. 12.

Step 101 of FIG. 1B includes monitoring and receiving observed data from a communication network 104. Contemplated by not shown in FIG. 1B can be sensors integrated with the overhead power distribution lines 112 to detect irregular events and locations via phasor management unit (PMU) connected to the communication network 104 to provide observed data. The PMU (not shown) can provide observed data to grid operators for online decision support. The power grid system can have PMUs positioned along overhead power distribution lines 112. The component failure prediction system can manage the PMUs and have multiple components, i.e. processor, interfaces, etc., all of which, the system configuration can depend upon a user system and operational requirements.

Referring to FIG. 1A and FIG. 1B, the component failure prediction system 100B of FIG. 1B includes the steps of FIG. 1A, illustrating the steps of, step 111, step 113, step 117, step 119 and step 121 of the processor, and step 123 by a device, steps not mentioned in FIG. 1B are assumed in FIG. 1A.

Some aspects of the components of component failure prediction system 100B not shown in FIG. 1B can optionally be connected to a Supervisory Control and Data Acquisition (SCADA) system of the power grid system or an electrical utility company, that monitors and relays information associated with the components, i.e. power line status and other infrastructure status. The specific configuration of the components for the embodiments depend upon user requirements and operation limitations, among some factors. In terms of the SCADA, a user can configure the SCADA as an industrial control system or a computer-based system for monitoring and controlling a process or equipment or infrastructure. Connected to the SCADA System can include a Human-Machine Interface (HMI), other computers and processors dedicated to certain tasks, Remote Terminal Units (RTUs). The RTU's can connect to sensors, convert sensor signals to digital data and send digital data to a system of the SCADA system which can be connected to the communication network 104, which communicates to the component failure prediction system 100B. Most control actions of the SCADA system can be performed by the RTUs or by programmable logic controllers (PLCs). The PLC can control some processes, but the SCADA system may allow operators to change aspects of the processes of the component failure prediction system 100B. At the RTU or PLC levels may include gathering data from other systems including equipment status reports which communicated to the SCADA system via the communication network 104. The data is processed for operators using the HMI for them to make decisions to adjust or make changes to predetermined RTU and PLC controls. The SCADA system's databases and software programs can be configured to provide trending and diagnostic data, as well as management information which can be communicated to the component failure prediction system 100B.

Figure 1C:
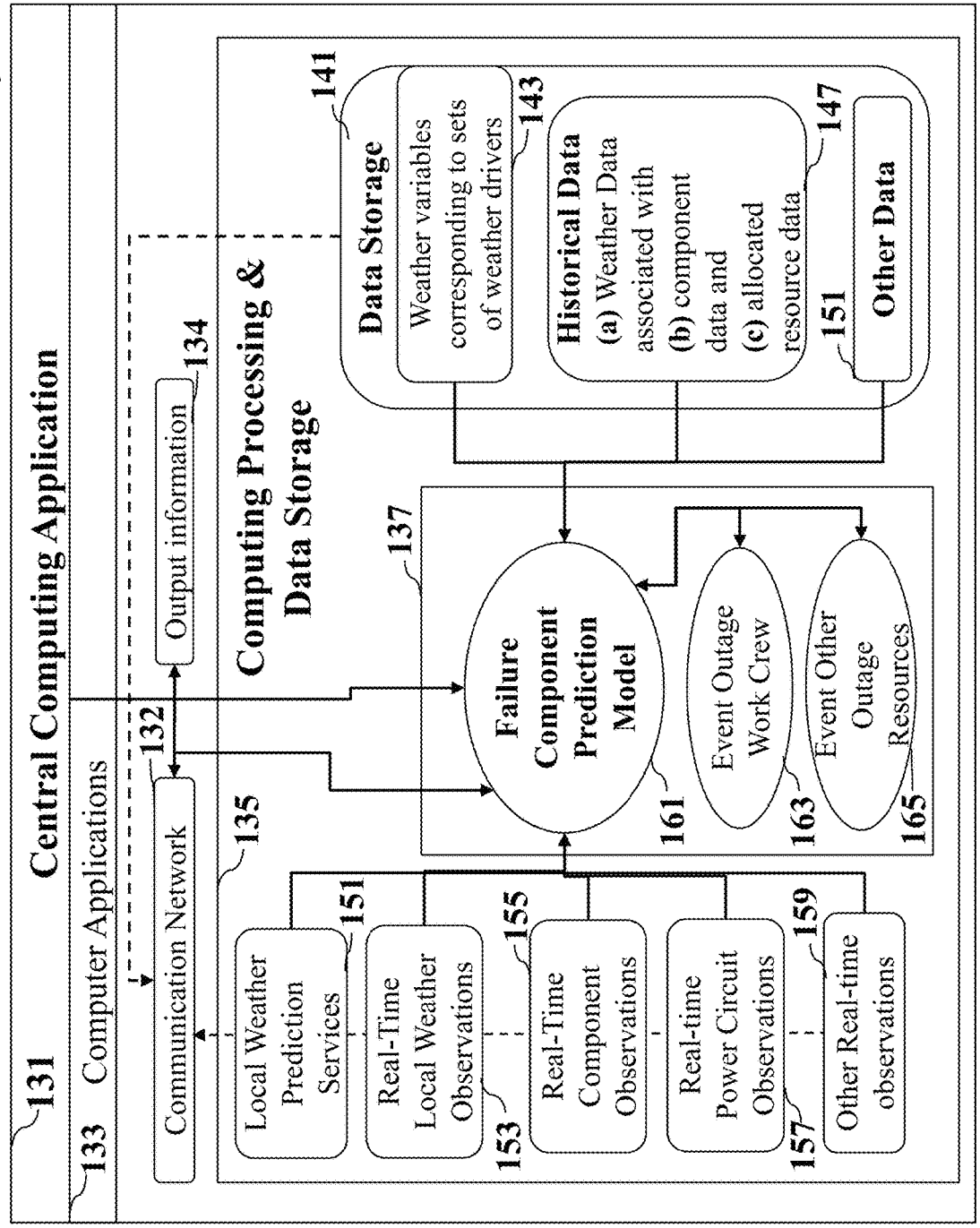
FIG. 1C is a schematic illustrating a component failure prediction system that is like the method of FIG. 1A, and shows a central computing application connected to computer applications and computing processing and data storage, according to some embodiments of the present disclosure.

FIG. 1C is a schematic illustrating a component failure prediction system 100C that is like the method of FIG. 1A and shows a central computing application 131 connected to computer applications 133 and computing processing and data storage 135, according to some embodiments of the present disclosure. The central computing application 131 can include one or more computers that can execute one or more applications 133 including an electric utility event outage management application (not shown). The central computing application 131 can include computing application processing and data storage 135 that can be incorporated with the system of FIG. 12 or one or more components of the system of FIG. 12, depending upon a user's system requirements and operational requirements. The computing application processing and data storage 135 can include one or more computers 137, data storage 141 (i.e. can be cloud based storage), local weather prediction services 151, real-time local weather observations 153, real-time component observations 155, real-time power circuit observations 157 and other observations 159, can may be connected directly to the communication network 132 connected to output information 134.

The failure component prediction model 137 can be integrated with or be connected to one or more applications 133, i.e., an electric utility storm outage management application (not shown). The failure component prediction model 137 can include an event outage work crew 163 and an event other outage resources 165, all of which depends upon a user requirements and operational configurations, and other user factors. In operation, an operator (not shown) may interface with one or more computing applications 133 through the central computing application 131, or through the failure component prediction model 137 through the central computing application 131, or both, depending on the user's operation and system requirements. Wherein, the operator may input information, display information, and generate data and information for the failure component prediction model 137 via components illustrated in FIG. 12.

Contemplated with one or more computing applications 133 can be embodiments including applications having programs, some programs can include an aspect having programs with instructions for changing a forecast model to accommodate received observed data of local conditions as measured in real-time by a local network of weather monitoring stations that provides comprehensive degrees of resolutions associated with a Supervisory Control and Data Acquisition system of an electrical power company, that by selecting parameterization schemes based on the received local conditions as measured real-time by the local network and based on the differences between predicted conditions and local conditions as measured. Other programs can have instructions for presenting a user interface to allow modification data by the user to modify results of the forecast model based on data conditions known by an operator and trend data, which may be received as either observed data or historical stored data, depending upon at what point in time the specific knowledge is attained (before the impending weather event having been identified and use of the model of the present disclosure. Still other programs can include instructions for initializing lateral boundary conditions based on larger scale numerical weather forecast data and lower boundary conditions based on climatological geographic data for a domain of the forecast model, of which may be received as either observed data or historical stored data, depending upon at what point in time the specific knowledge is attained.

In terms of parameterization schemes there can be cumulus, boundary layer parameterization, surface layer parameterization and micro-physics, wherein each scheme can have sub-schemes. For example, a power grid can request for more weather condition information due to being concerned about damage to their overhead distribution lines or some other components caused by weather variables including high winds and lightning. The power grid can request from an atmospheric science group/station to select a specific parameterization scheme optimized for some aspect of convection and the high winds and lightning associated with it, which can then be how the atmospheric science group/station parameterize the certain features within the model.

Parameterization in a weather or climate model in the context of numerical weather prediction is a method of replacing processes that are too small-scale or complex to be physically represented in the model by a simplified process. This can be contrasted with other processes—e.g., large-scale flow of the atmosphere—that are explicitly resolved within the models. Associated with these parameterizations are various parameters used in the simplified processes. Examples include the descent rate of raindrops, convective clouds, simplifications of the atmospheric radiative transfer based on atmospheric radiative transfer codes, and cloud microphysics. Radiative parameterizations are important to both atmospheric and oceanic modeling alike. Atmospheric emissions from different sources within individual grid boxes also need to be parameterized to determine their impact on air quality.

Still referring to FIG. 1C, the data storage 141 can include weather variables corresponding to model forcings 143 (also referred as "a set of weather drivers"), historical data 147 and other stored data 151. During operation the failure component prediction model 137 can be connected to the data storage 141, to access historical data 147 and other data 151. The historical data 147 can include weather data associated with component data and allocated resource data.

Depending upon the operation system configuration data can generated based on past weather events, estimated amounts of different types of resource allocations for an impending weather event at a predetermined location. For example, some aspects of resource allocations for the impending weather event for the predetermined location may include steps of identifying resource allocation data corresponding to the identified parameters of the impending weather event for estimating the output value. For example, the identified parameters of the impending weather event may include corresponding sets of data specific to resource allocations for the predetermined location. Wherein based upon the possible corresponding sets of data being available stored in the data storage 141, the failure component prediction model 137 may be able to estimating maintenance parameters, such as, for example, predicted damages to a power circuit, predicted maintenance crew person-days to repair the damages, predicted consumer outages from the damage, predicted estimated time to restore the power circuit, predicted estimated time to restore power to a particular customer, predicted estimated cost to restore the power circuit, and the like.

Contemplated is that an application of the computing application 133 may also track in real-time actual maintenance parameters, such as, for example, actual damages to the power circuit, actual maintenance crew person-days to repair the damages, actual consumer outages from the damage, actual time to restore the power circuit, actual time to restore power to a particular customer, actual cost to restore the power circuit, and the like, that is communicated via the communication network 132 to the failure prediction model 137.

Still referring to FIG. 1C, contemplated is that the communication network 132 can include one or more server computers (not shown) in communication with client computers (not shown) for the electric utility storm outage management application (computer applications 133), to utilize. For example, the communication network 132 can be connected client computers, other computing devices, such as, mobile phones, and laptops & tablets. The communication network 132 may be a wireless network, a fixed-wire network, a local area network (LAN), a wide area network (WAN), an intranet, an extranet, the Internet, or the like. The communications network 132 can be the Internet, for example, server computers can be Web servers which client computers communicate via any of a number of known communication protocols.

Still referring to FIG. 1C, the local weather prediction service 151 can include predicted wind speed and duration, a predicted storm duration, a predicted snowfall amount, a predicted icing amount, and a predicted rainfall amount, a predicted storm type (e.g., hurricane, wind, ice, tornado, lighting, etc.), a predicted lightning location and intensity, and the like. The weather prediction may be embodied in or may accompany a Geographic Information System (GIS) file, or the like. The local weather prediction service 151 may include a national weather service bureau, a weather service organization, for some other weather prediction service. The real-time local weather observations 153 may be from sensors (not shown) located approximate a predetermined location. Real-time components, i.e. overhead lines, can generate sensor data via sensors (not shown) via the component observations 155 located in a predetermined location. The real-time power circuit observations 157 may be from sensors (not shown) located approximate the predetermined location. The other real-time observations 159 can include other data useful for the failure component prediction model 137 to generate a result, or data that can be associated with any aspect of the power grid system including maintenance issues, operational issues, management issues, etc.

Figure 2A:
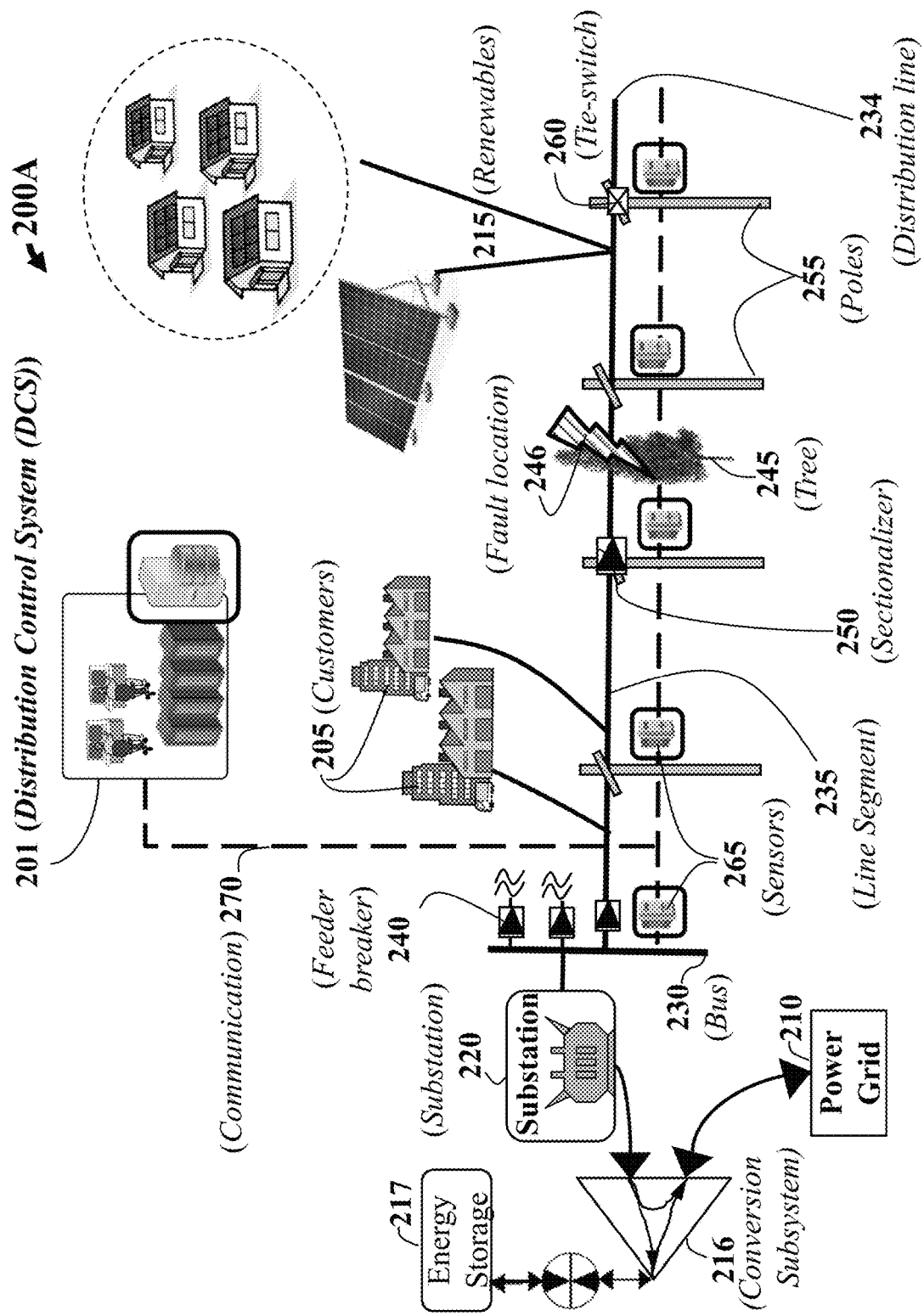
FIG. 2A is a schematic illustrating the components of power distribution system and the relationship between the components of the system, according to some embodiments of the present disclosure.

FIG. 2A is a schematic illustrating some components of a power distribution system 200A and a relationship between some components of the system, according to some embodiments of the present disclosure. The power distribution system 200A can be operated by a distribution control system 201. The distribution control system 201 can transfer powers supplied by a main power grid 210 through a substation 220 to one or more feeder breakers 240 to a distribution line 234 the load customers, 205. The distribution control system 201 may also include local distribution generations sources 215, such as renewable generations and energy storage 217 via a conversion subsystem 216. The substation 220 may connect several feeders 240 through a bus 230. Each feeder 240 may include multiple distribution line segments 235 and poles 255. Both the main grid 210 and the distribution control system 201 can be part of the main grid 210. The distribution control system 201 can also be included into a control system (not shown) for the main grid 210.

Still referring to FIG. 2A, the power distribution system 200A can adjust its topology connectivity thorough operating switching devices installed in the system, such as feeder breakers 240, normally-closed switches, i.e. sectionalizer 250, and normally-opened switch, i.e. tie-switch 260. The power distribution system 200A can monitor its operation states by examining corresponding data collected from sensors 265 installed on poles 255, line segments 235 and buses 230 and any other device (not shown) associated with the operation of the power distribution system 200A. The sensors 265 can send measurements to the distribution control system 201 through communication lines 270 or devices (not shown) attached or located approximate other devices and systems associated with operation of the power distribution system 200A. The distribution lines 234 and other devices (not shown) may be out of service due to a fault at a fault location 246, due to many reasons, including self-degradation, or environmental impacts such as fallen trees 245 caused by heavy winds. Besides sensor readings from the sensors 265, the distribution control system 201 can also monitor system anomaly events based on information provided by trouble calls from customers 205, or from other sources.

Figure 2B:
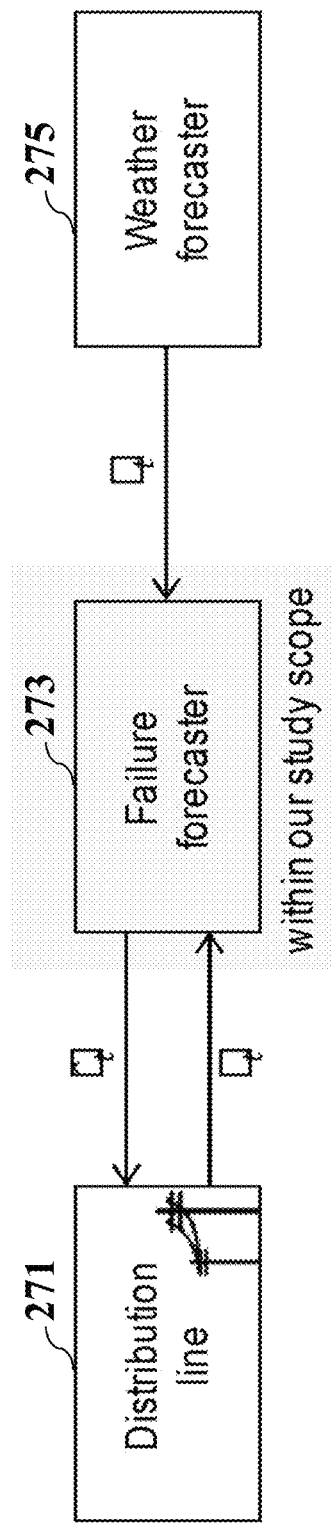
FIG. 2B is a block diagram illustrating some method steps of an online distribution line failures forecasting problem, according to embodiments of the present disclosure.

FIG. 2B is a block diagram illustrating some method steps of an online distribution line failure forecasting problem, according to embodiments of the present disclosure.

As shown in FIG. 2B, the distribution line failures forecasting problem is defined as an online sequential decision-making problem. That is, for each round $t \in [T]$, the failure forecaster 273 of each distribution line 271 first observes a forecasted weather condition $x_t \in \mathbb{R}^{+^n}$ provided by weather forecaster 275, then makes a forecast about the outage status $\hat{y}_t \in \{0,1\}$, and finally receives the reported outage status $y_t \in \{0,1\}$. When $y_t(\hat{y}_t)=1$, the line is on outage, otherwise the line is in service. The above defined problem induces multiple triplet tuples $(x_t, \hat{y}_t, y_t)$ for entire time horizon T, which constitutes a tuple trajectory $(x_1, \hat{y}_1, y_1)$, $(x_2, \hat{y}_2, y_2), \ldots, (x_{T-1}, \hat{y}_{T-1}, y_{T-1}), (x_T, \hat{y}_T, y_T)$.

According to embodiments of the present disclosure, a tabular weather representation method is first used to reduce possible weather condition scenarios. Then the original problem is converted into multiple independent Bernoulli bandit problems. Finally, two types of learning frameworks are used to design the failure forecaster in the problem.

In this disclosure, wind gust speed $x_t^w$ and lightning stroke current $x_t^l$ are used to represent the weather condition, i.e. $x_t=(x_t^w, x_t^l)$, which are effective to model line failures. In order to reduce scenarios of the weather condition $x_t$, a tabular weather representation method is used.

Figures 2C, 2D:
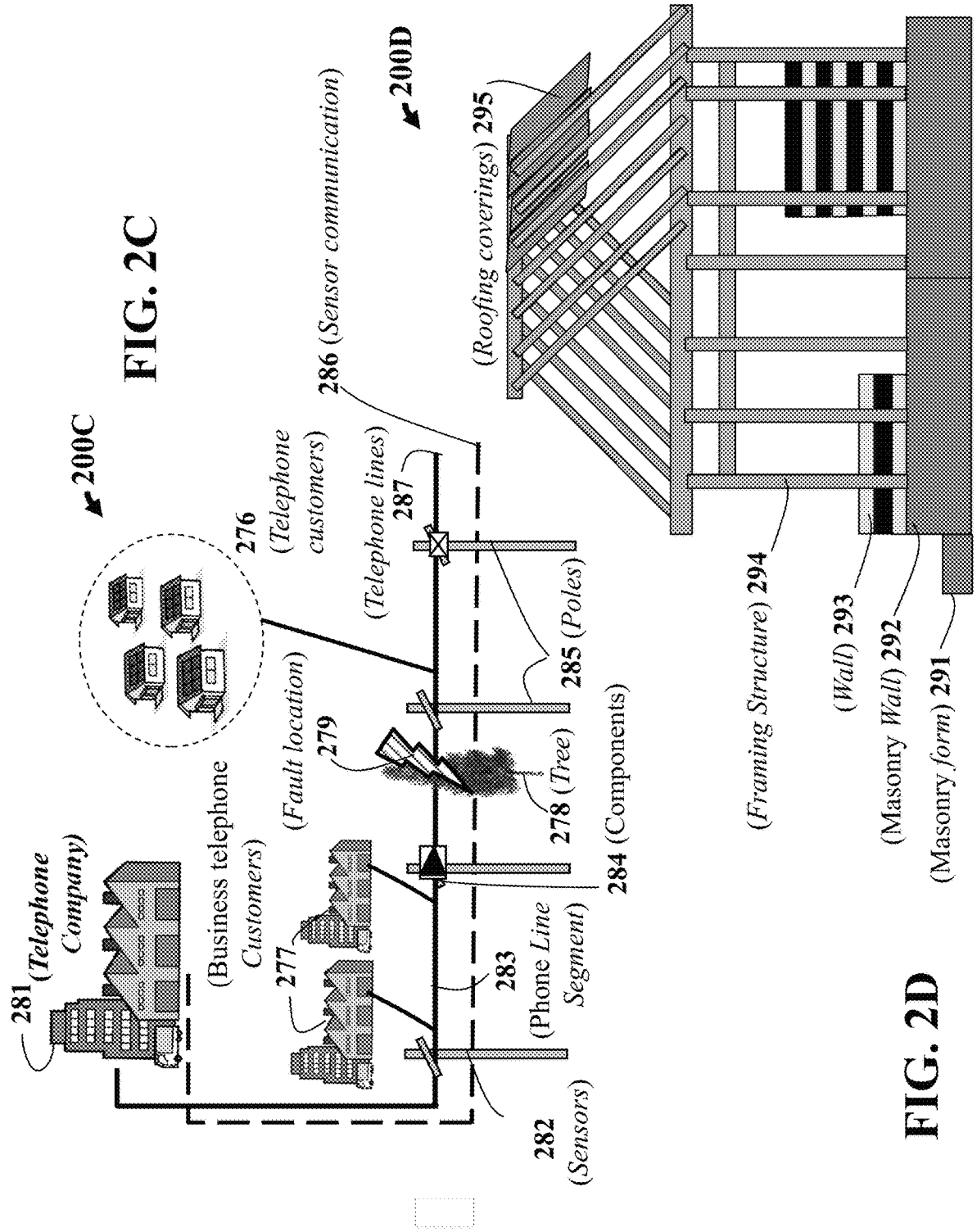
FIG. 2C is a schematic illustrating a telephone company landscape 200C that some embodiments are configured to prediction telephone components status that are susceptible to severe weather events, according to embodiments of the present disclosure.
FIG. 2D is a schematic illustrating a construction project that some embodiments are configured to prediction construction project components status that are susceptible to severe weather events, according to embodiments of the present disclosure.

FIG. 2C is a schematic illustrating a telephone company landscape 200C that some embodiments are configured to prediction telephone components status that are susceptible to severe weather events, according to embodiments of the present disclosure. A telephone company 281 includes sensors 282 connected to a sensor communication line 286 (may be wireless connection), telephone lines 287 connected to telephone poles 285. Residential customers 276 and Business telephone customers 277 with telephone services are connected to the telephone lines 286. The telephone lines 286 include phone line segments 283 and the telephone poles include components 284. Like overhead distribution lines for power grids, telephone poles 285 have the same fault 279 problems with trees 278 and other vegetation approximate the poles 285.

FIG. 2D is a schematic illustrating a construction project that some embodiments are configured to prediction construction project components status that are susceptible to severe weather events, according to embodiments of the present disclosure. Construction projects 200D include components including forms 291, masonry wall 292, wall 293, structural framework 294 and roof coverings 295, are susceptible to severe weather.

Figure 3A:
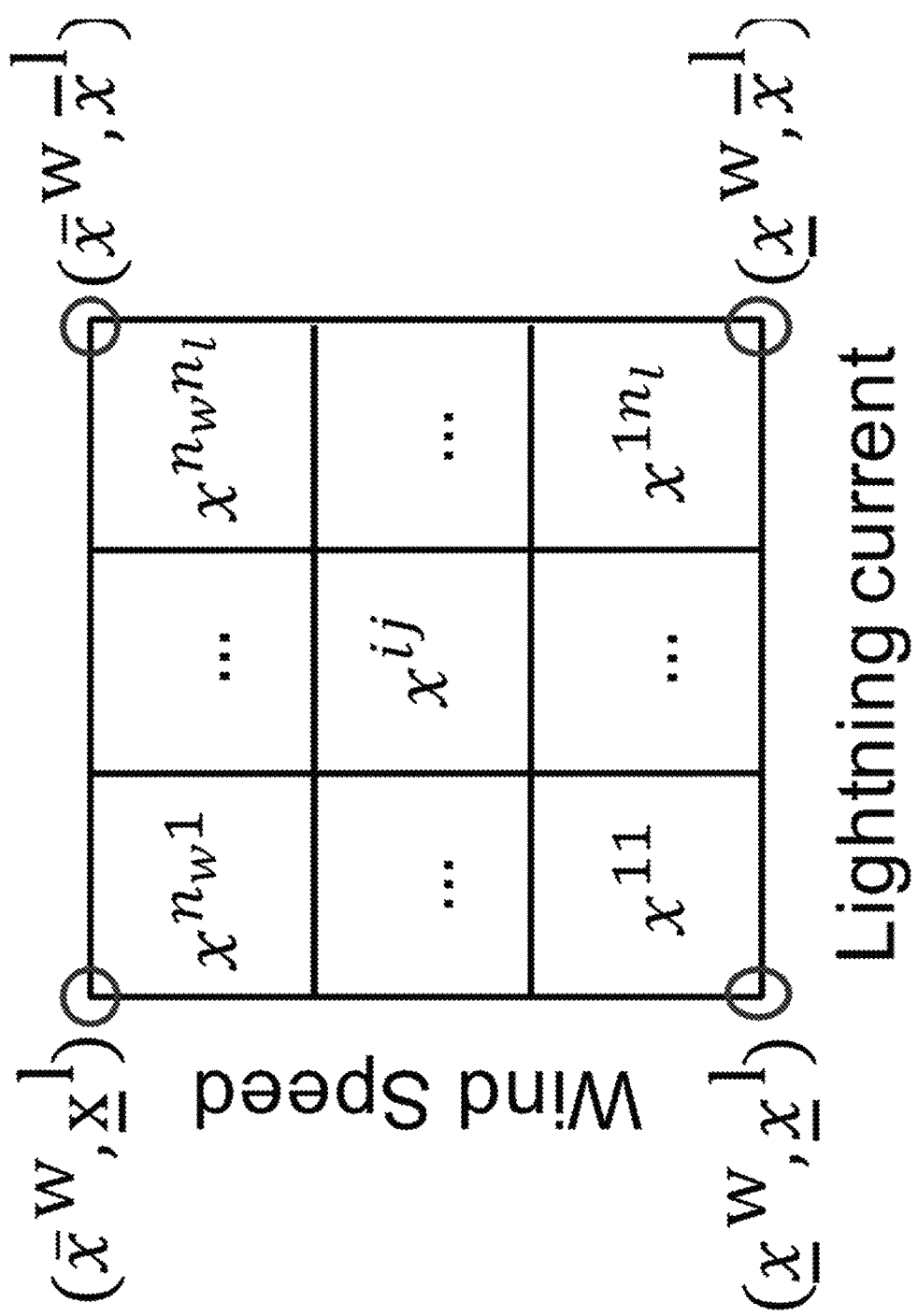
FIG. 3A is a schematic illustrating a tabular weather representation, according to embodiments of the present disclosure.

FIG. 3A is a schematic illustrating a tabular weather representation, according to embodiments of the present disclosure.

According to historical data in the weather station, it is easy to obtain the information such as the minimum/maximum wind gust speed $\underline{x}^w/\overline{x}^w$ and the minimum/maximum lightning current $\underline{x}^l/\overline{x}^l$. Then a table with $n_w$ rows and $n_l$ columns is constructed. For cell ij (the i-th row and the j-th column, $1 \leq i \leq n_w$, $1 \leq j \leq n_l$), it is denoted by a set $x^{ij}$:

$$x^{ij} = \left[\underline{x}^w + \frac{\overline{x}^w - \underline{x}^w}{n_w}(i-1), \underline{x}^w + \frac{\overline{x}^w - \underline{x}^w}{n_w}i\right) \times \left[\underline{x}^l + \frac{\overline{x}^l - \underline{x}^l}{n_l}(j-1), \underline{x}^l + \frac{\overline{x}^l - \underline{x}^l}{n_l}j\right). \quad (1)$$

Still referring to FIG. 3A, if the weather condition falls to the ranges described by $x^{ij}$, $x_t \in x^{ij}$, then $x_t$ can be represented by $x^{ij}$. When $n_w$ and $n_l$ are large enough, this representation is accurate enough because with certain range the difference of the weather condition is minimal.

Figure 3B:
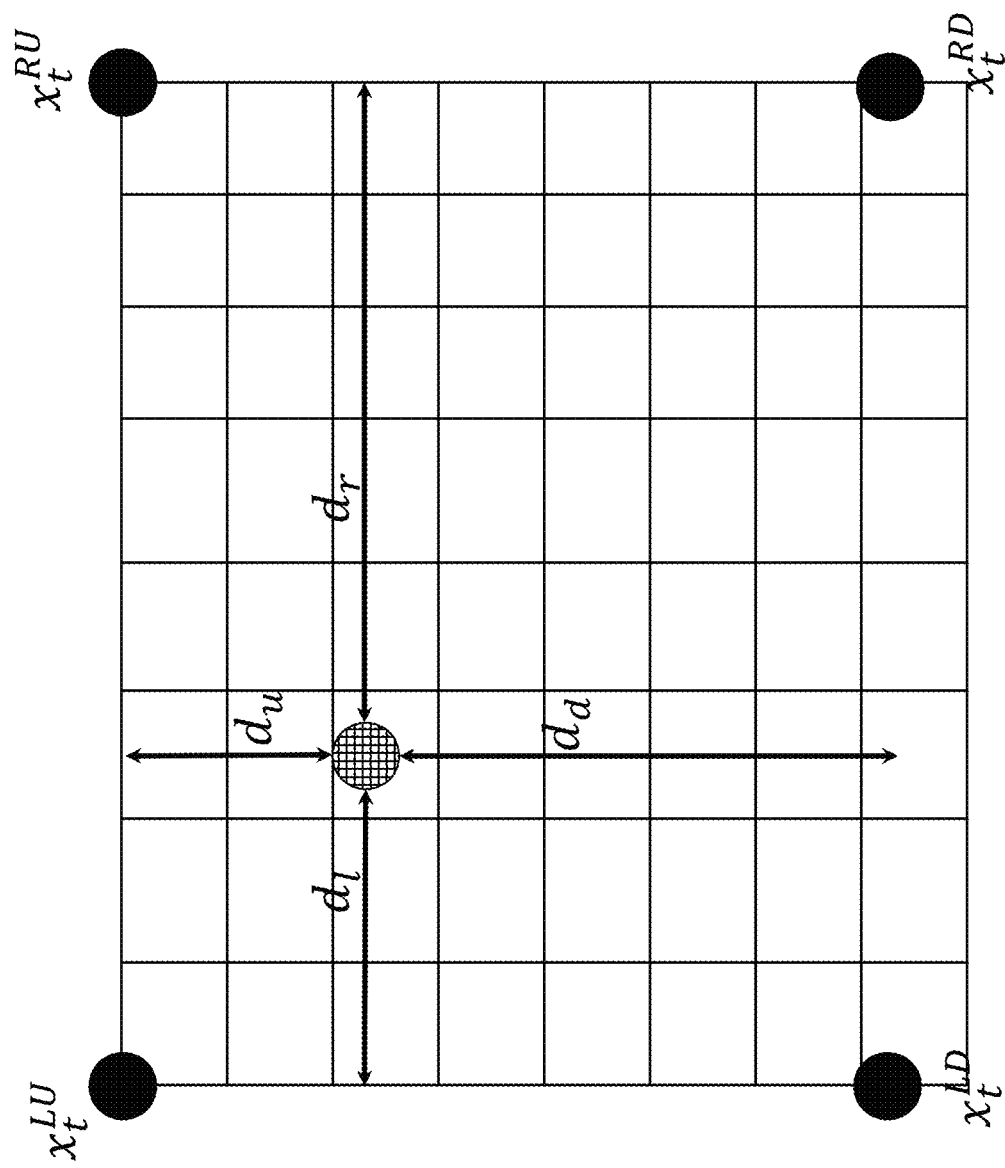
FIG. 3B is a schematic illustrating deriving weather conditions for a smaller region based on larger region measurements, according to embodiments of the present disclosure.

If the required resolution weather data for the pre-determined smaller region are not available, the weather measurements for larger regions can be used to derive the required data based on distances from the smaller region under study to the centers of measured larger regions FIG. 3B is a schematic illustrating deriving weather conditions based on larger region measurements, according to embodiments of the present disclosure.

Assumed the region under study is bounded by a rectangular area and its boundary points correspond to the centers of measured regions. The weather for the region for time t, $x_t$ can be derived based on weather measurements at boundary points, $x_t^{LD}$, $x_t^{RD}$, $x_t^{LU}$, $x_t^{RU}$ and its distances to the boundaries, $d_l$, $d_r$, $d_d$, $d_u$, according to:

$$x_t = \frac{x_t^{LU} d_d d_r + x_t^{LD} d_u d_r + x_t^{RU} d_d d_l + x_t^{RD} d_u d_l}{(d_l + d_r)(d_d + d_u)}. \quad (2)$$

Figure 4:
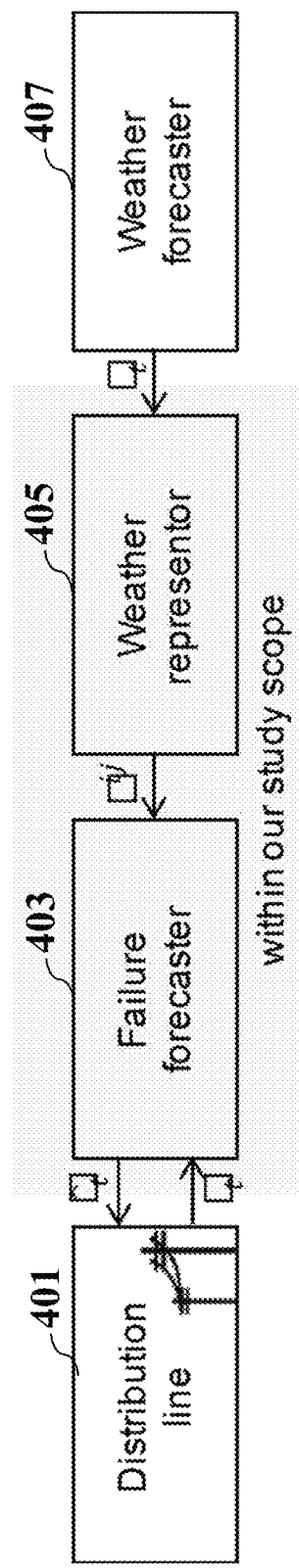
FIG. 4 is a block diagram illustrating some method steps of a converted online distribution line failures forecasting problem, according to embodiments of the present disclosure.

FIG. 4 is a block diagram illustrating some method steps of a converted online distribution line failures forecasting problem, according to embodiments of the present disclosure. The weather forecaster 407 provides weather forecasts to a weather representer 405, and the weather representer sends processed weather conditions to the failure forecaster 403 to predict the outage status of the distribution line 401.

Referring to FIG. 4, the weather representer 405 equipped with tabular weather representation method is integrated into the problem and substitute the feedback signal $y_t$ with a binary reward $r_t \in \{0,1\}$ which is assumed to be Bernoulli distributed. Then the problem can be converted into multiple independent Bernoulli bandit problems.

FIG. 4 illustrated that for each round $t \in [T]$, the weather representer of each line first represents $x_t$ as $x^{ij}$, then the agent defined as the failure forecaster observes a state $x^{ij}$ and chooses a two-valued action $\hat{y}_t$, and finally receives the reward $r_t$ based the action he/she chooses. Note that the action is chosen irrespective of the state, i.e., each state solves an independent Bernoulli bandit problem. The reward $r_t$ is designed as $1-|\hat{y}_t-y_t|$, which reflects prediction correctness, i.e., $r_t=+1$ with the correct prediction and $r_t=0$ with the wrong prediction.

Next two learning framework are used to design the failure forecaster in the problem.

Still referring to FIG. 4, in the context of Bernoulli bandit problem, it is assumed that $r_t$ follows a Bernoulli distribution, i.e., $$r_t \sim Ber\left(\mu_{\hat{y}_t}^{ij}\right) \text{ where } \mu_{\hat{y}_t}^{ij} = P_r\left(r_t = 1 | \mu_{\hat{y}_t}^{ij}\right) = P_r(r_t = 1 | \hat{y}_t, x^{ij}).$$

For the agent to decide which action is best, we must define the value of selecting each action. These values are called the action values or the action value function. The value of selecting an action is defined as the expected reward the agent receives when selecting that action:

$$q_*^{ij}(y) := E[r_t | \hat{y}_t = y, x^{ij}] = \mu_y^{ij}, \forall y \in \{0, 1\} \quad (3)$$

where y is the value of $\hat{y}_t$. Given $x^{ij}$, the goal of the agent is to maximize the expected reward $$\hat{y}_t^* = \underset{y}{\mathrm{argmax}}\, q_*^{ij}(y) = \underset{y}{\mathrm{argmax}}\, \mu_y^{ij}.$$

Unfortunately, $\mu_y^{ij}$ isn't known to the agent. Instead, a way is needed to estimate it.

Still referring to FIG. 4, the first type of estimator is using a Maximum Likelihood (ML) estimation method. Let $r^{ij} = \{r_t | x_t \in x^{ij}\}$ denote the set of rewards the agent has in state $x^{ij}$. The ML estimator of $\mu_y^{ij}$ is given by maximizing the log-likelihood of $r^{ij}$ given $\mu_y^{ij}$:

$$\hat{\mu}_y^{ij} = \underset{\mu_y^{ij}}{\mathrm{argmax}}\, \log P_r(r^{ij} | \mu_y^{ij}) = \frac{\sum_{r \in r^{ij}} r}{|r^{ij}|} \quad (4)$$

where $|r^{ij}|$ is the number of elements in $r^{ij}$. The ML estimator $\hat{\mu}_y^{ij}$ is a sample average that reflects the accuracy of predicting y in state $x^{ij}$. Then an ML based online failure forecaster is designed in Algorithm 1.

---
Algorithm 1 ML-based Online Failure Forecaster
---

1: initialize $\hat{\mu}_y^{ij}[0] = 0$ and $r^{ij} = \emptyset$ for $\forall y, \forall i, \forall j$
2: for t = 1:T do
3:   Agent observes a state $x_t$ represented by $x^{ij}$
4:   if $\hat{\mu}_0^{ij}[t-1] = \hat{\mu}_1^{ij}[t-1]$ then
5:     Agent uniformly samples an action $\hat{y}_t$ -continued ---
Algorithm 1 ML-based Online Failure Forecaster
---

6:   else
7:     Agent selects an action $\hat{y}_t = \text{argmax}_y \hat{\mu}_y^{ij}[t-1]$
8:   end if
9:   Agent receives a reward $r_t$
10:  Agent updates $r^{ij} \leftarrow r^{ij} \cup \{r_t\}$ and $\hat{\mu}_y^{ij}[t] = \dfrac{\sum_{r \in r^{ij}} r}{|r^{ij}|}$
11: end for Still referring to FIG. 4, algorithm 1 is a greedy action selection method, which exploits current knowledge to maximize immediate reward without spending time exploring apparently inferior actions to see if they might really be better. In order to balance exploration and exploitation, this disclosure also provides a $\epsilon$-greedy based estimation method and a upper-confidence-bound (UCB) based estimation method by making slight modifications to Algorithm 1.

In the $\epsilon$-greedy method, the agent either selects the best action $$\text{argmax}_y \hat{\mu}_y^{ij}[t-1]$$

with a probability $1-\epsilon$ or the actions at random with a probability $\epsilon$.

Still referring to FIG. 4, in the UCB method, the agent selects the action that has the highest estimated action-value function plus the upper-confidence bound exploration term, which considers the inherent uncertainty in the accuracy of his estimate $$\hat{y}_t = \text{argmax}_y \hat{\mu}_y^{ij}[t-1] + c\sqrt{\dfrac{\ln(t)}{n_y^{ij}[t-1]}} \quad (6)$$

where $\ln(t)$ is the natural logarithm of t, $n_y^{ij}[t-1]$ is the number of times that action y has been selected prior to time t, and c>0 controls the exploration level.

The second type of estimator is using a Maximum A.Posteriori (MAP) based estimation method. The $\mu_y^{ij}$ is assumed to be modeled as a Beta prior, i.e., $\mu_y^{ij} \sim \text{Beta}(\alpha_y^{ij}, \beta_y^{ij})$ where $\alpha_y^{ij}$ and $\beta_y^{ij}$ are parameters of the prior $p(\mu_y^{ij})$ which we are free to set according to our prior belief about $\mu_y^{ij}$. By varying $\alpha_y^{ij}$ and $\beta_y^{ij}$, a wide range of possible beliefs can be encoded. The MAP estimator of $\hat{\mu}_y^{ij}$ is given by maximizing the log-posterior of $\mu_y^{ij}$ given $r^{ij}$:

$$\hat{\mu}_y^{ij} \text{argmax}_{\mu_y^{ij}} \log p(\mu_y^{ij}|r^{ij}) = \text{argmax}_{\mu_y^{ij}}[\log P_r(r^{ij}|\mu_y^{ij}) + \log p(\mu_y^{ij})] = \dfrac{\sum_{r \in r^{ij}} r + \alpha_y^{ij} - 1}{|r^{ij}| + \beta_y^{ij} - 1 + \alpha_y^{ij} - 1} \quad (7)$$

Still referring to FIG. 4, the distinction between ML and MAP is that the former is to find a $\mu_y^{ij}$ under which the $r^{ij}$ is most likely, and the latter is to find the most likely $\mu_y^{ij}$ given $r^{ij}$. As $|r^{ij}| \to \infty$, it is easy to see the effect of the prior goes to zero, and the MAP estimator is close to the ML estimator. Therefore, the MAP estimator could be interpreted as a regulated version of the ML estimator.

The MAP estimator is particularly useful when dealing with rare events. For example, extreme weather events are rare. The ML estimator tells the agent that $P_r(r_t=1|\hat{y}_t=1, r^{ij})=0$. The MAP estimator would allow the agent to incorporate its prior knowledge that there is some large probability that taking $\hat{y}_t=1$ will receiving a positive reward even if he just hasn't seen it yet. The prior knowledge here could be fragility curve which demonstrates a fact that the more severe weather condition the line suffers, the more likely it encounters outage, and thus a heuristic method is proposed to set prior parameters:

$$\alpha_y^{ij} = \begin{cases} n_w + n_l - (i+j+2) & y = 0 \\ i+j+2 & y = 1 \end{cases} \quad (8)$$

$$\beta_y^{ij} = \begin{cases} i+j+2 & y = 0 \\ n_w + n_l - (i+j+2) & y = 1 \end{cases} \quad (9)$$

where $\alpha_y^{ij}$ and $\beta_y^{ij}$ can be interpreted as number of times of $r_t=1$ and $r_t=0$ when $\hat{y}_t=y$, respectively. Then a MAP based online failure forecaster is designed in Algorithm 2.

---
Algorithm 2 MAP-based Online Failure Forecaster
---

1: initiaslize $\alpha_y^{ij}[0]$ and $\beta_y^{ij}[0]$ (by (8) and by (9)) for $\forall y, \forall i, \forall j$
2: for t = 1:T do
3:   Agent observes a state $x_t$ represented by $x^{ij}$
4:   Agent samples $\hat{\mu}_y^{ij}[t] \sim \text{Beta}(\alpha_y^{ij}[t-1], \beta_y^{ij}[t-1])$ for $\forall y$
5:   if $\hat{\mu}_0^{ij}[t] = \hat{\mu}_1^{ij}[t]$ then
5:     Agent uniformly samples an action $\hat{y}_t$
6:   else
7:     Agent selects an action $\hat{y}_t = \text{argmax}_y \hat{\mu}_y^{ij}[t]$

| Algorithm 2 MAP-based Online Failure Forecaster |
|---|
| 8:   end if |
| 9:   Agent receives a reward $r_t$ |
| 10.   Agent updates $(\alpha_y^{ij}[t], \beta_y^{ij}[t]) \leftarrow (\alpha_y^{ij}[t-1] + r_t, \beta_y^{ij}[t] + 1 - r_t)$ |
| 11: end for |

Still referring to FIG. 4, algorithm 2 is a Thompson sampling (TS) action selection method, which utilizes the prior knowledge to explore the action space. As posterior distribution gradually concentrates, the agent will perform less exploration and more exploitation, which strikes an effective balance.

To demonstrate the disclosed algorithms, the overhead distribution lines have been taken as an example. Two of the most influential weather events, wind W and lightning L are selected as the weather-relative outage causes, where wind gust speed X and natural log of lightning stroke current Z are representative weather data, respectively. A two-valued outage status Y is considered: Y=0 (i.e., in service) and Y=1 (i.e., on outage). The relation among W, L, X, Z and Y can be represented by a Bayesian network as shown in FIG. 5A.

Figure 5A:
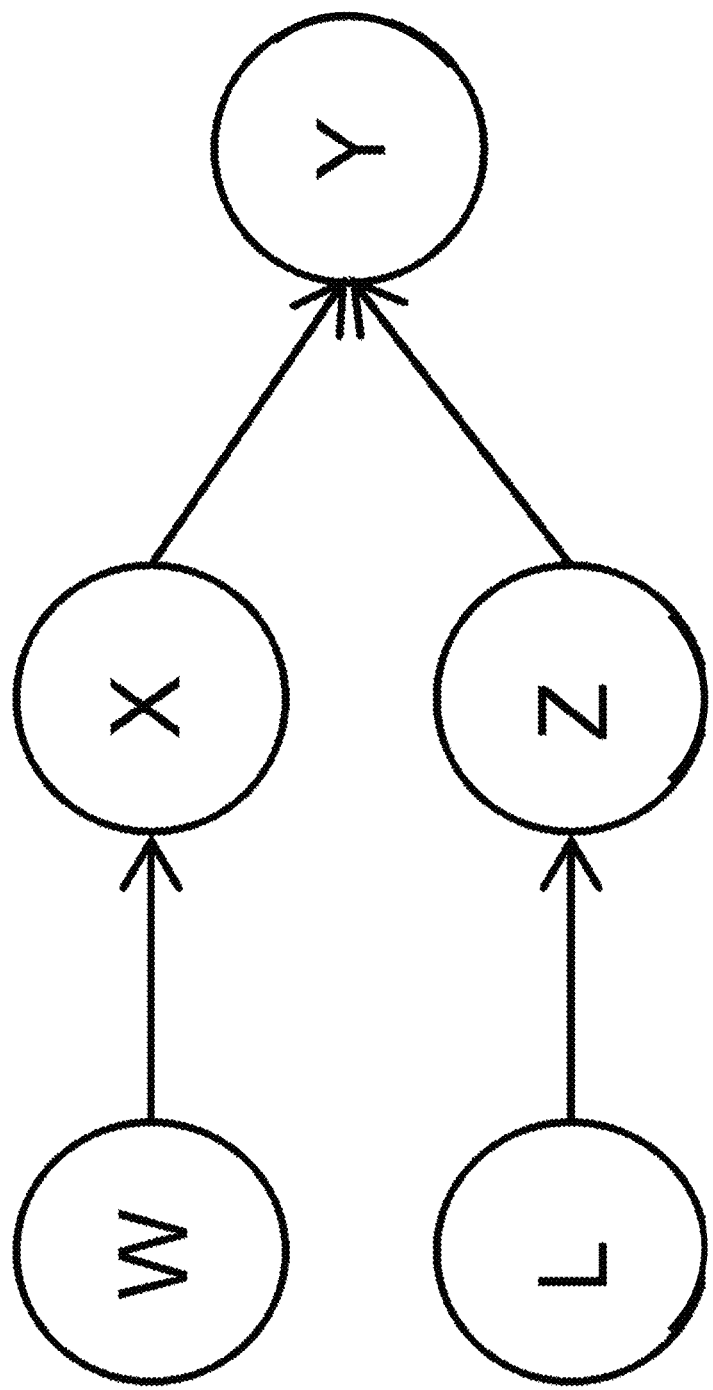
FIG. 5A is a schematic illustrating a Bayesian network for data generation, according to embodiments of the present disclosure.

FIG. 5A is a schematic illustrating a Bayesian network for data generation, according to embodiments of the present disclosure. It depicts a data generation process with the following joint distribution:

$$P_r(W,L,X,Z,Y) = P_r(W)P_r(L)P_r(X|W)P_r(Z|L)P_r(Y|X,Z) \quad (10)$$

Figure 5B:
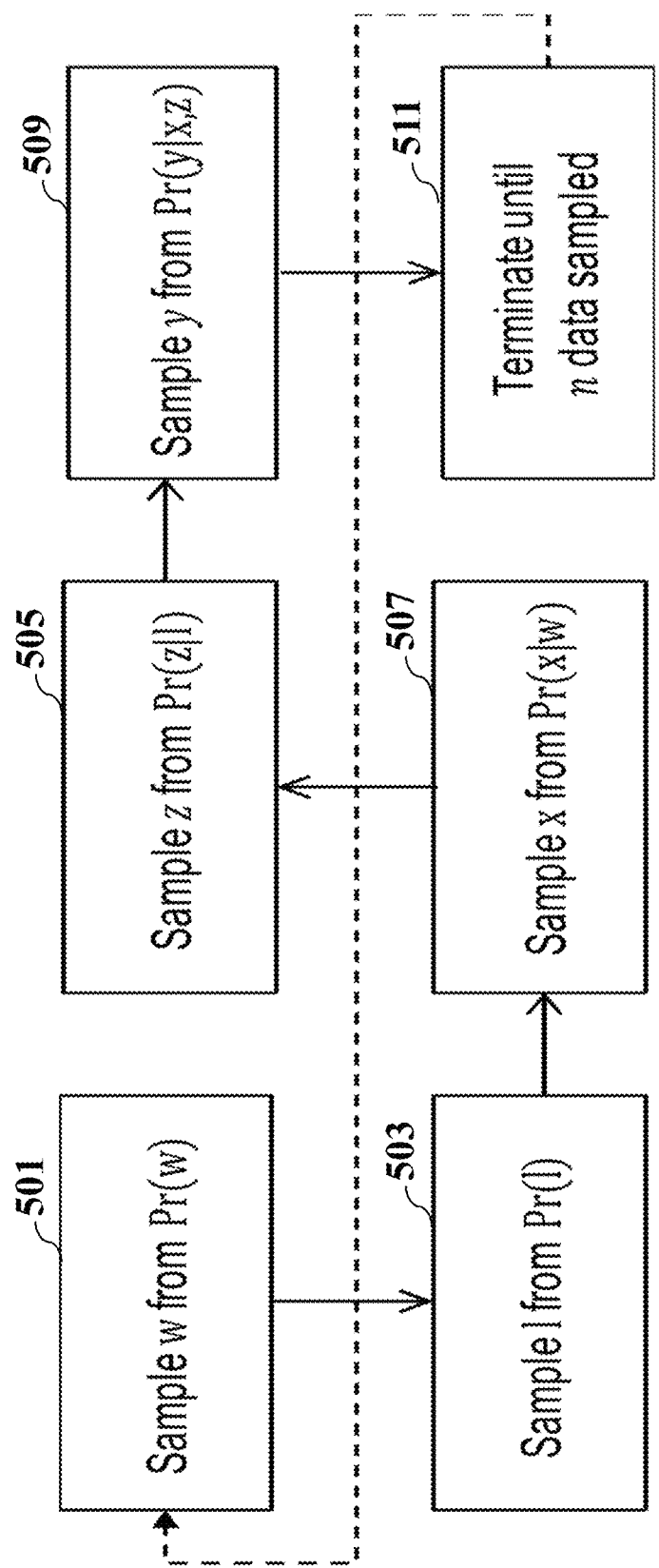
FIG. 5B is a block diagram illustrating some process steps of to generate dataset(s) of artificial data points for failure forecasting algorithm testing, according to embodiments of the present disclosure.

Based on (10), a dataset with n artificial data points can be generated by following the process specified in FIG. 5B.

FIG. 5B is a block diagram illustrating some process steps of to generate dataset(s) of artificial data points, according to embodiments of the present disclosure. Where w, l, x, z and y are values of random variables W, L, X, Z and Y, respectively. We define three wind-based weather events $w \in \{1,2,3\}$ in term of wind level, as well as five lightning-based weather events $l \in \{1,2,3,4,5\}$ in term of lightning level. Therefore, a discrete distribution law is used to parameterize $P_r(W)$ and $P_r(L)$. Both wind gust speed $x \geq 0$ and lightning stroke current $z \geq 0$ are assumed to follow a truncated normal distribution. Then, $P_r(W|W) = N(\mu_{X|W}, \sigma_{X|W})$ and $P_r(Z|L) = N(\mu_{Z|L}, \sigma_{Z|L})$, where $\mu_{X|W}, \sigma_{X|W}$ are the mean and standard deviation for X|W, and $\mu_{Z|L}, \sigma_{Z|L}$ are the mean and standard deviation for Z|L. The outage state $y \in \{0,1\}$ is assumed to follow a Bernoulli distribution with parameter $\mu_{Y|X,Z} = P_r(Y=1|X,Z)$.

Still referring to FIG. 5B, for generating dataset(s) of artificial data points, we first sample w and l from $P_r(W)$ and $P_r(L)$, 501 and 503. Then sample x and z from $P_r(X|W)$ and $P_r(Z|L)$, 507 and 505, then sample y from $P_r(Y|X,Z)$, 509. This process is repeated until required data samples are obtained, 511.

The parameters of each component in (10) can be customized as statistics of one specific distribution line. Note that the parameter $\mu_{Y|X,Z}$ can be interpreted as the failure probability. Therefore, we directly use a failure rate model induced failure probability to set the parameter $\mu_{Y|X,Z}$:

$$\mu_{Y|X,Z} = 1 - e^{c \times e^{\beta_0 + \beta_1 X + \beta_2 Z + \beta_3 XZ}} \quad (11)$$

where for example, $$C = -\frac{1}{24}, \beta_0 = -3.0832, \beta_1 = 0.057, \beta_2 = 0.3817,$$

$\beta_3 = -0.0019$. By changing the value of intersection $\beta_0$, the reader can simulate distribution lines with the different robustness to the same weather events.

Figure 6A:
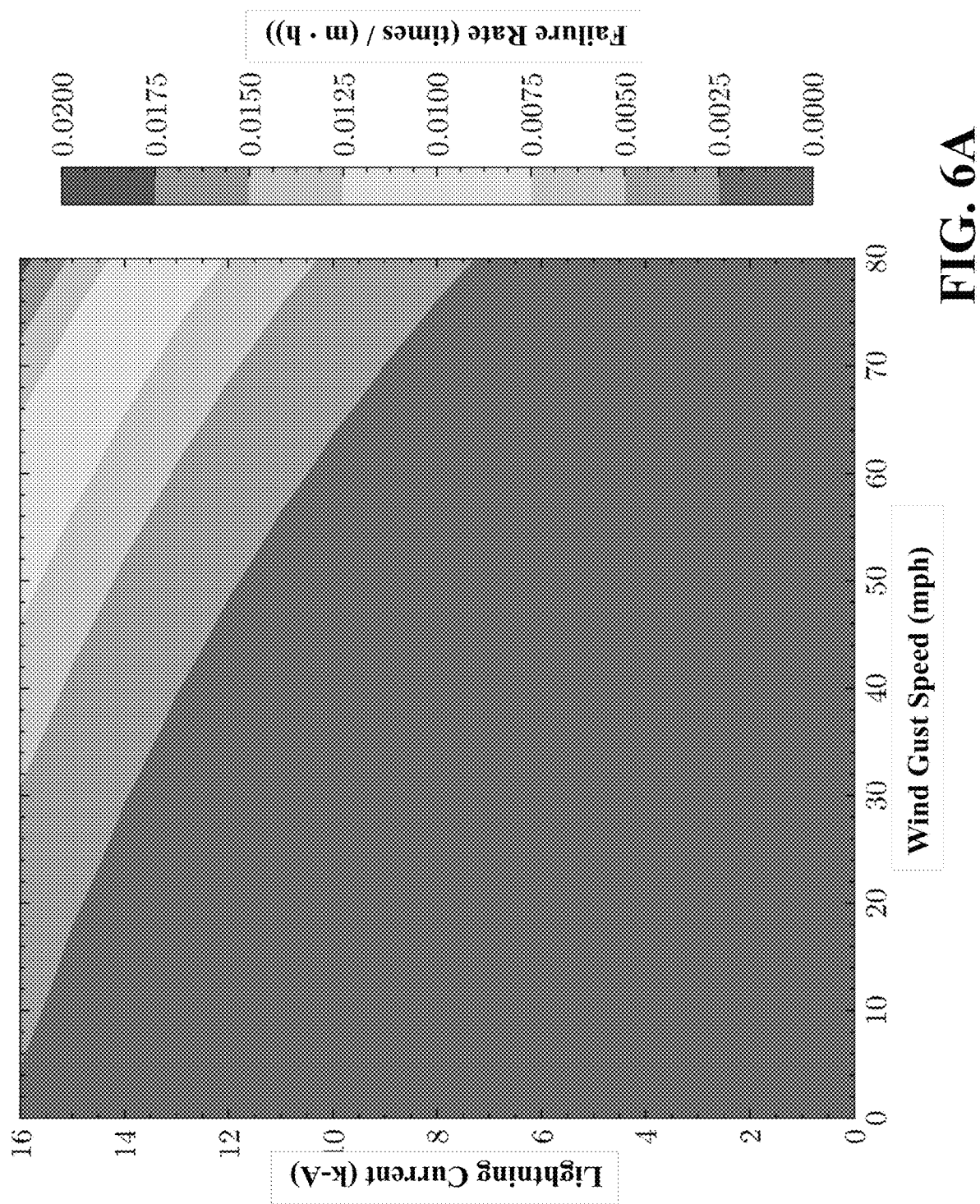
FIG. 6A is a graph illustrating aspects of the failure rate model, according to embodiments of the present disclosure.
Figure 6B:
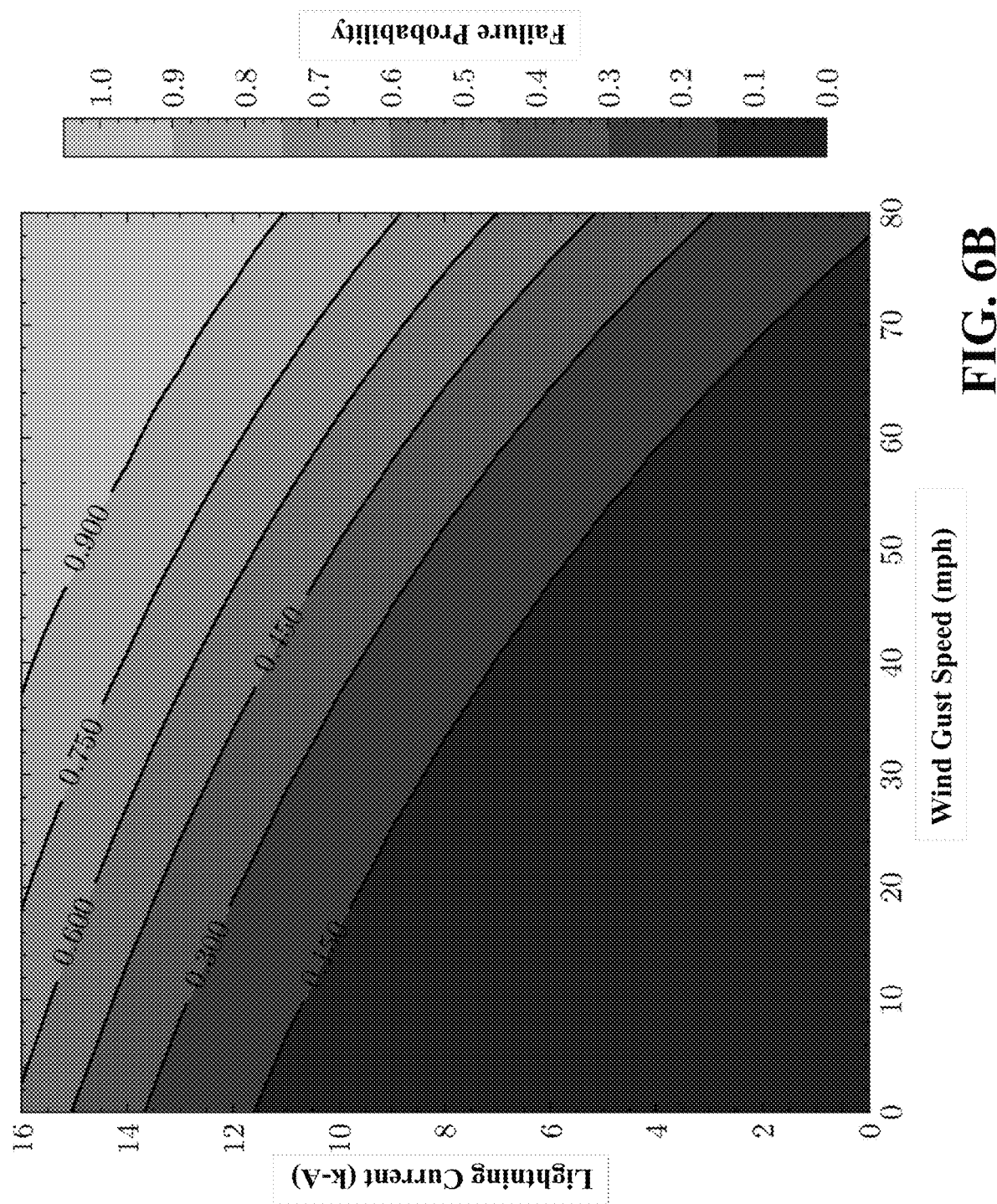
FIG. 6B is a graph illustrating aspects of the failure probability model, according to embodiments of the present disclosure.

FIG. 6A is a graph illustrating aspects of the failure rate model, according to embodiments of the present disclosure. FIG. 6B is a graph illustrating aspects of the failure probability in equation 11, according to embodiments of the present disclosure.

FIG. 6A and FIG. 6B illustrate the failure rate and the failure probability having one to one correspondence of the points, i.e., the higher the failure rate is, the higher the failure probability is. The detailed parameter settings are given in Table 1, FIG. 7A for wind and Table 2, FIG. 7B for lightning.

FIG. 7A is a table illustrating parameters settings for wind-relative data generation, according to embodiments of the present disclosure; and FIG. 7B is a table illustrating parameters settings for lightning-relative data generation, according to embodiments of the present disclosure.

Then a dataset with 10,000 artificial data points is generated to verify the proposed online forecasting algorithm. Their data distribution is shown in FIG. 8.

Figure 8:
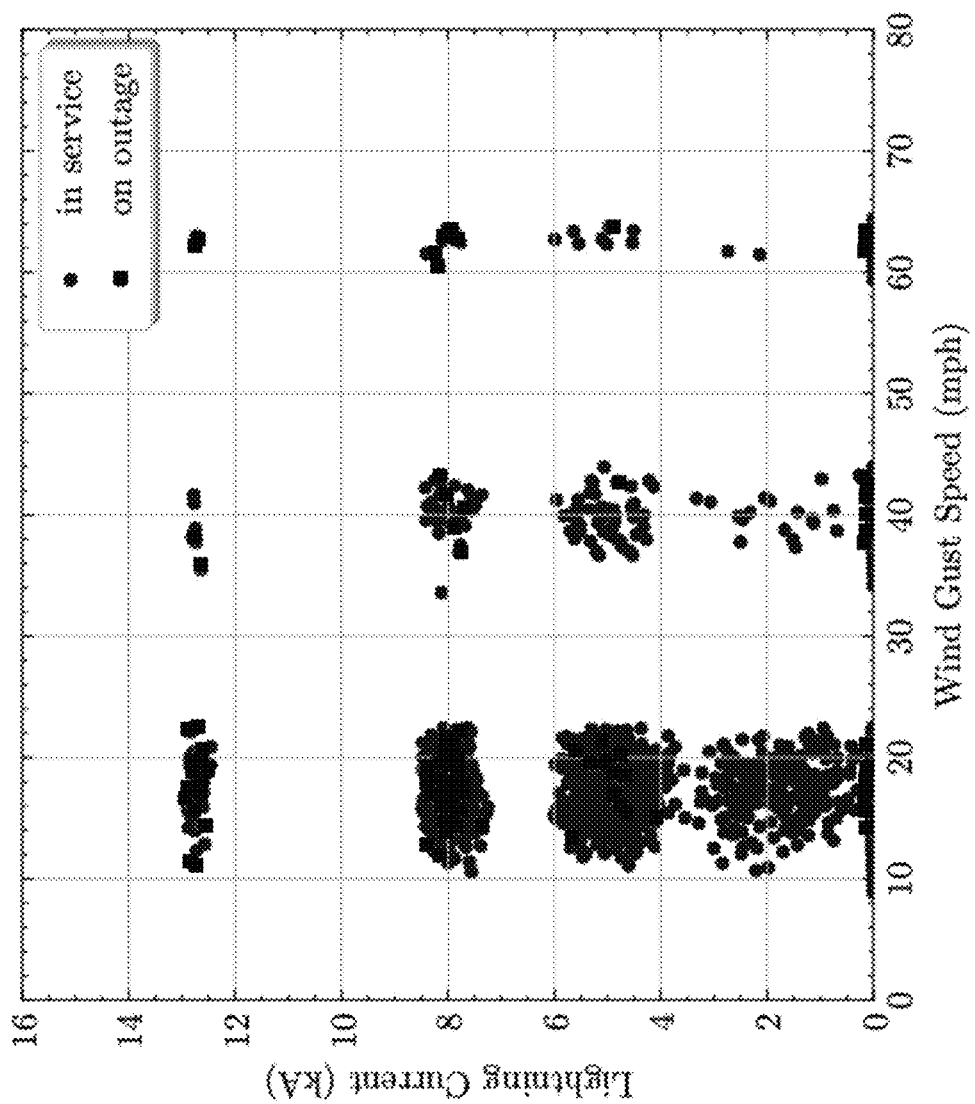
FIG. 8 is a graph illustrating a data distribution of artificial data points in term of wind gust speeds and lightning currents, where a dataset having 10,000 artificial data points is generated to verify the online forecasting algorithms described in Algorithms 1-2 and their variations, according to embodiments of the present disclosure.

FIG. 8 is a graph illustrating a data distribution of artificial data points, where a dataset having 10,000 artificial data points is generated to verify the online forecasting algorithms described Algorithm 1 and Algorithm 2, and their variations, according to embodiments of the present disclosure. It can be observed that most of points are situated in the area with low wind gust speed and small lightning current while most of outages occurs in the weather event with either high wind gust speed or large lightning current.

To evaluate performance of the disclosed algorithms, the following two classification metrics are employed:

$$\text{Accuracy} = \frac{TP + TN}{TP + TN + FP + FN} \quad (12)$$

$$F1 = \frac{2TP}{TP + FP + FN} \quad (13)$$

where TP is the true positive indicator, i.e., is the algorithm predicts "on outage" and the actual status is indeed "on outage", TN is the true negative indicator, i.e., is the algorithm predicts "in service" and the actual status is indeed "in service", FP is the false positive indicator, i.e., is the algorithm predicts "on outage" but the actual status is "in service", and FN is the false negative indicator, i.e., is the algorithm predicts "in service" but the actual status is "on outage".

Figure 9A:
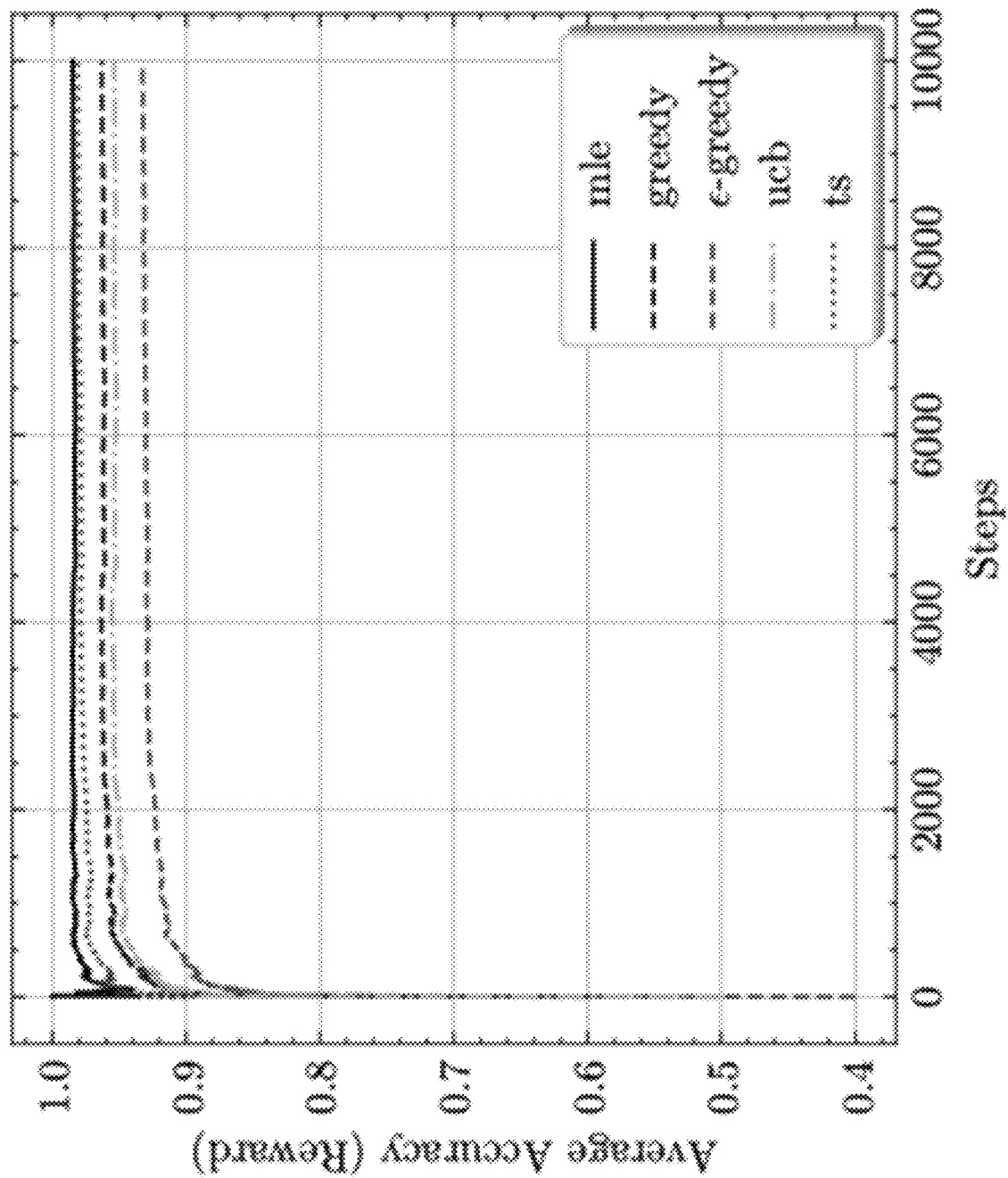
FIG. 9A is a graph illustrating an evaluation result for 5 different algorithms using average accuracy according to embodiments of the present disclosure.
Figure 9B:
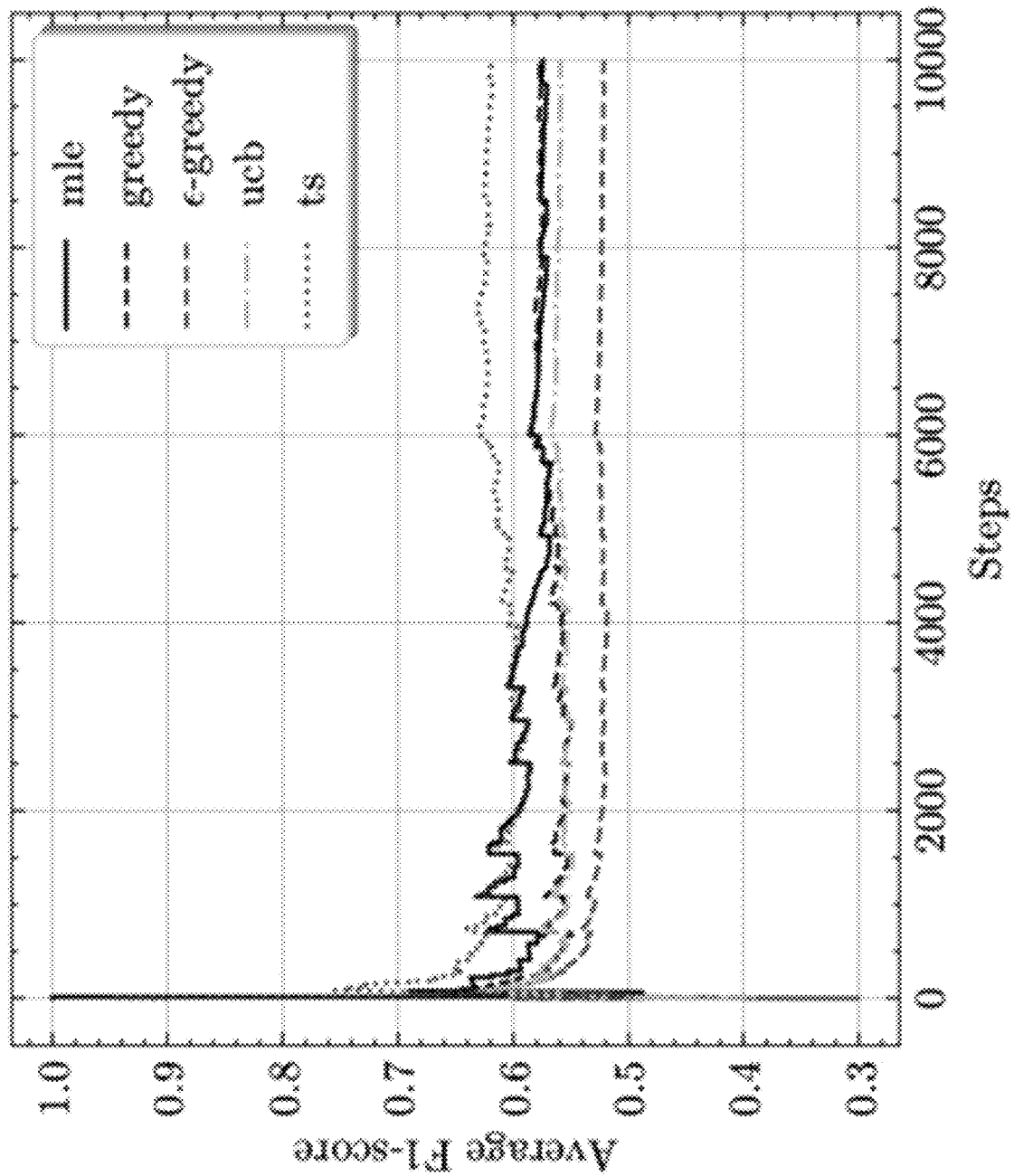
FIG. 9B is a graph illustrating an evaluation result for 5 different algorithms using average F1-score, according to embodiments of the present disclosure.

FIG. 9A is a graph illustrating an evaluation result using average accuracy according to embodiments of the present disclosure. FIG. 9B is a graph illustrating an evaluation result using average F1-score, according to embodiments of the present disclosure.

As shown in FIG. 9A and FIG. 9B, five action selection strategies are compared where "mle" is a base method to directly model outage status using maximum likelihood estimation, "greedy", "ε-greedy", and "ucb" are action selection strategies based on Algorithm 1, and "ts" is based on Algorithm 2. As the time step goes, each action selection strategy can converge, and "ts" can perform the best with the highest average accuracy and F1-score after a period of learning. The other action selection strategies are not as good as "ts", because their exploration is unguided.

In addition, the density of probability distribution for "ts" are also visualized in FIGS. 10A-10C and FIGS. 11A-C.

Figure 10A:
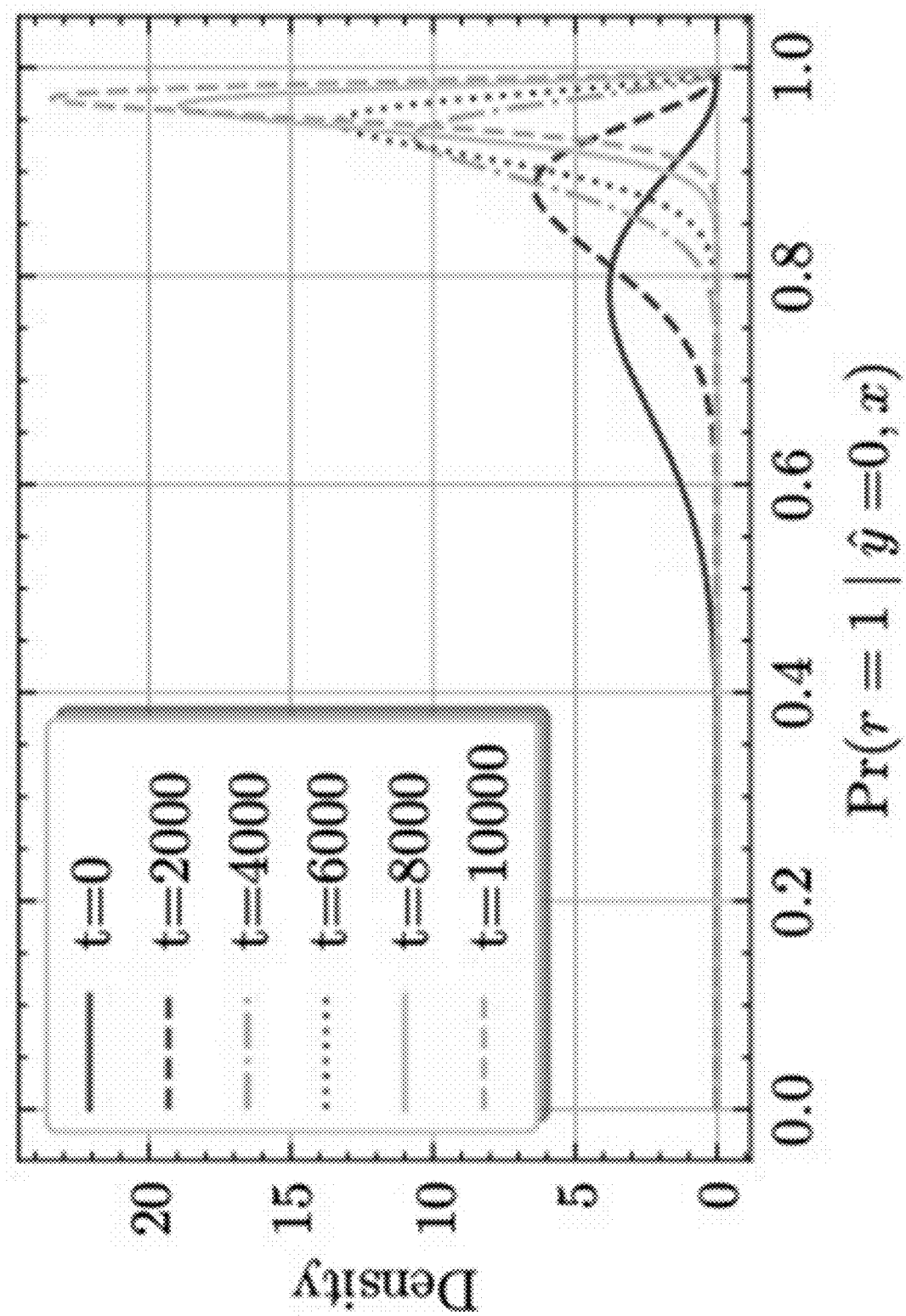
FIG. 10A is a graph illustrating the density of probability distribution for probability of reward is 1 by given status prediction is 0 for high occurrence weather events, according to embodiments of the present disclosure.

FIG. 10A is a graph illustrating the density of probability distribution for probability of reward is 1 by given status prediction is 0 for high occurrence weather events, according to embodiments of the present disclosure.

Figure 10B:
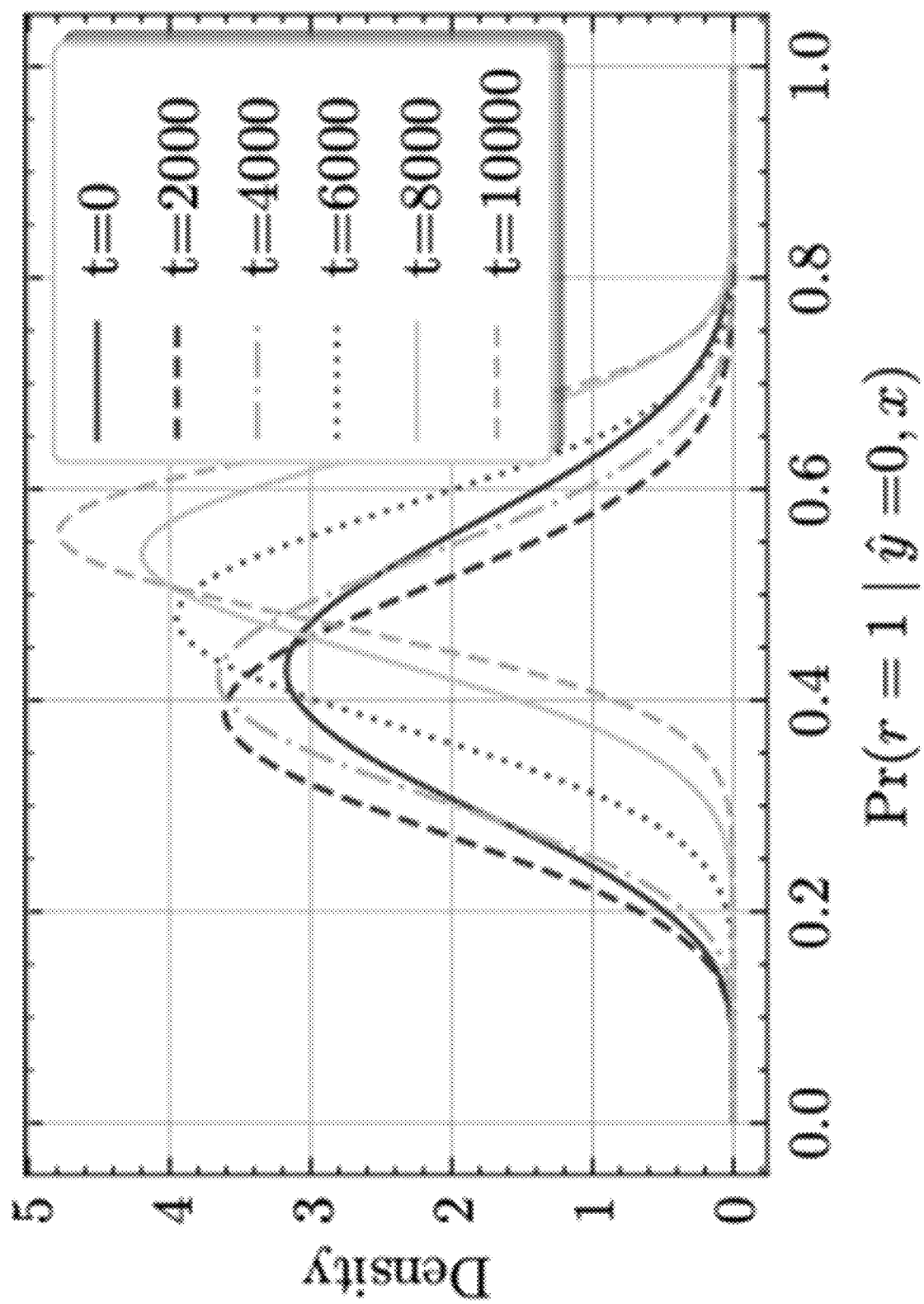
FIG. 10B is a graph illustrating the density of probability distribution for probability of reward is 1 by given status prediction is 0 for medium occurrence weather events, according to embodiments of the present disclosure.

FIG. 10B is a graph illustrating the density of probability distribution for probability of reward is 1 by given status prediction is 0 for medium occurrence weather events, according to embodiments of the present disclosure.

Figure 10C:
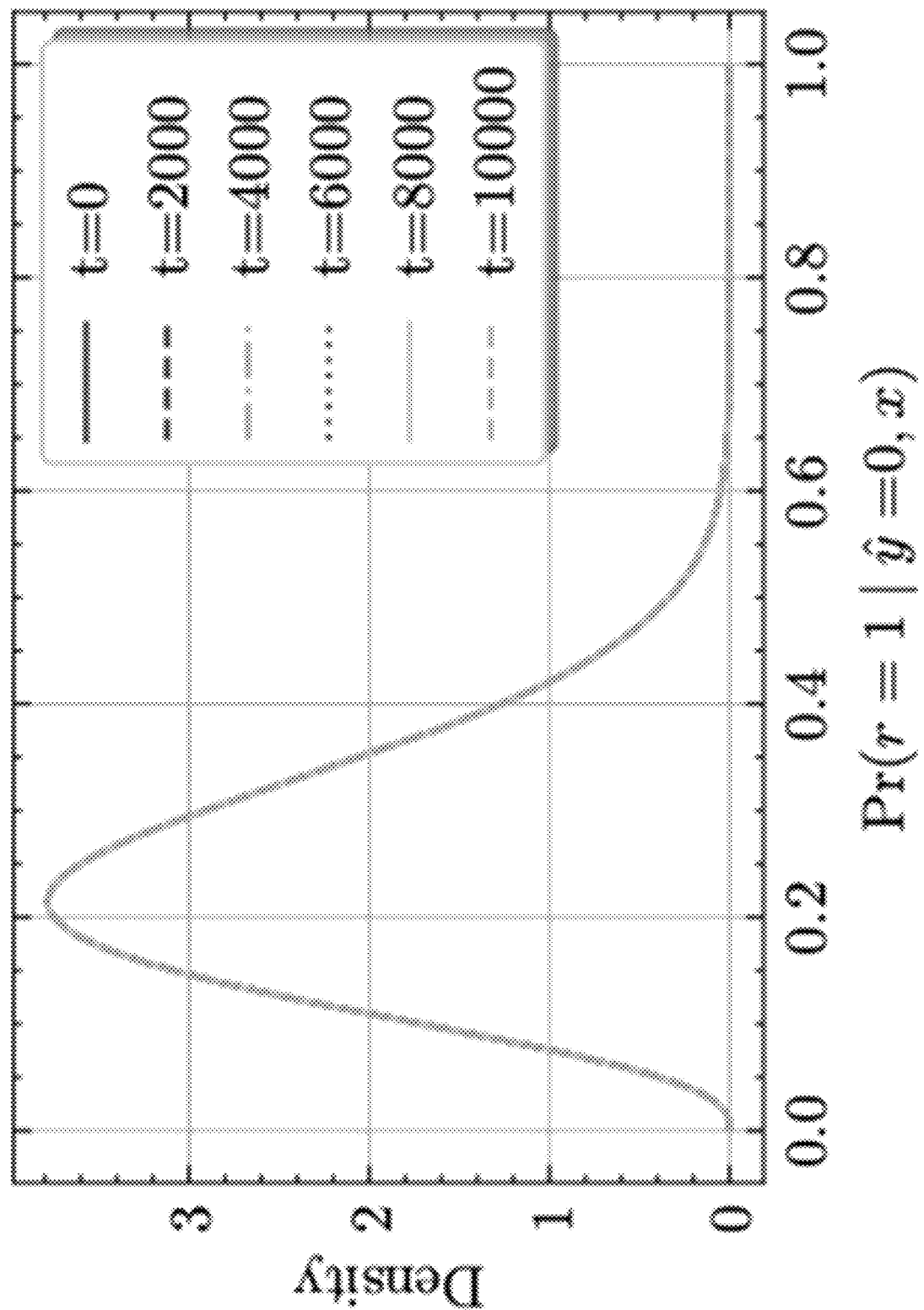
FIG. 10C is a graph illustrating the density of probability distribution for probability of reward is 1 by given status prediction is 0 for low occurrence weather events, according to embodiments of the present disclosure.

FIG. 10C is a graph illustrating the density of probability distribution for probability of reward is 1 by given status prediction is 0 for low occurrence weather events, according to embodiments of the present disclosure.

Figure 11A:
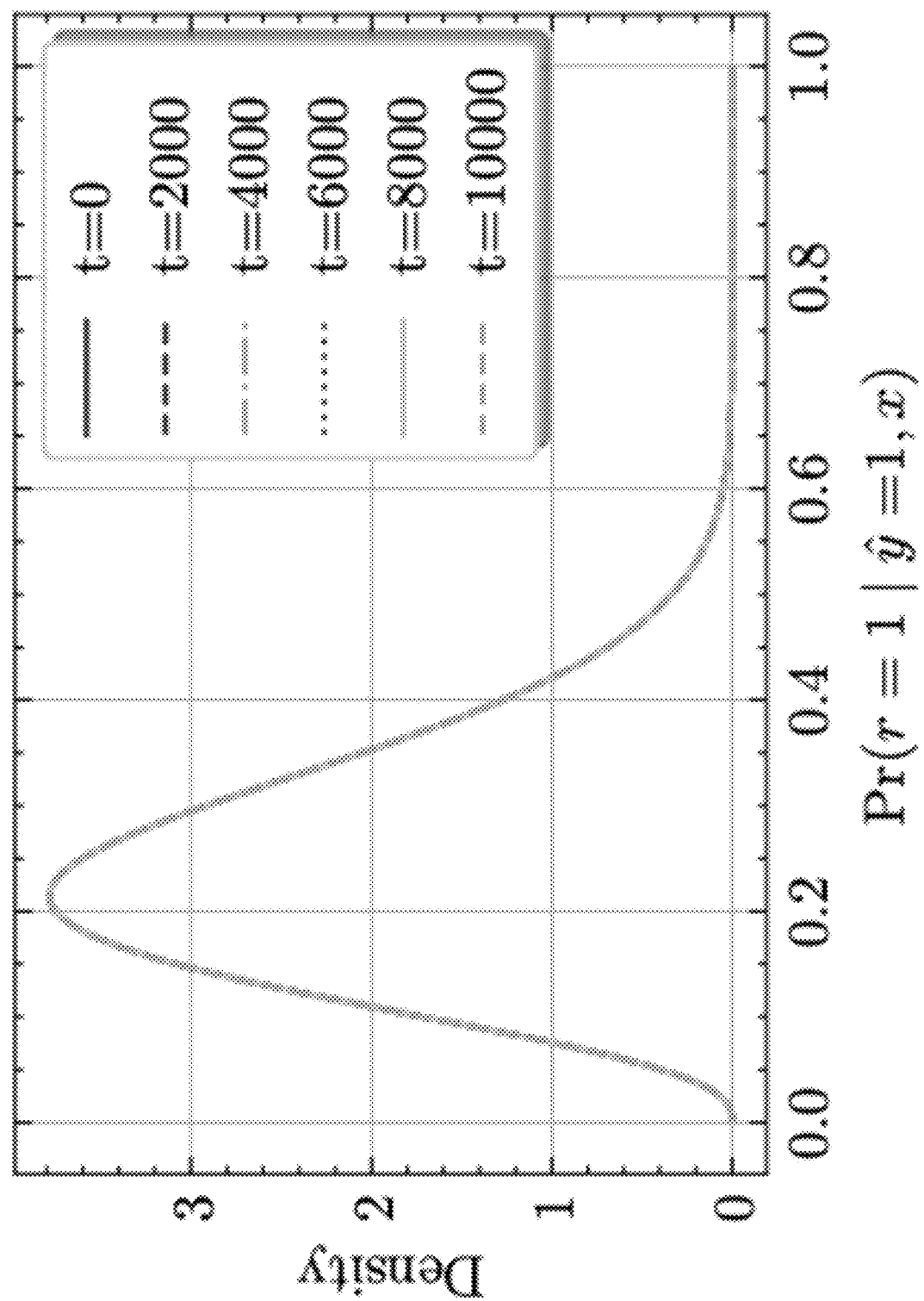
FIG. 11A is a graph illustrating the density of probability distribution for probability of reward is 1 by given status prediction is 1 for high occurrence weather events, according to embodiments of the present disclosure.

FIG. 11A is a graph illustrating the density of probability distribution for probability of reward is 1 by given status prediction is 1 for high occurrence weather events, according to embodiments of the present disclosure.

Figure 11B:
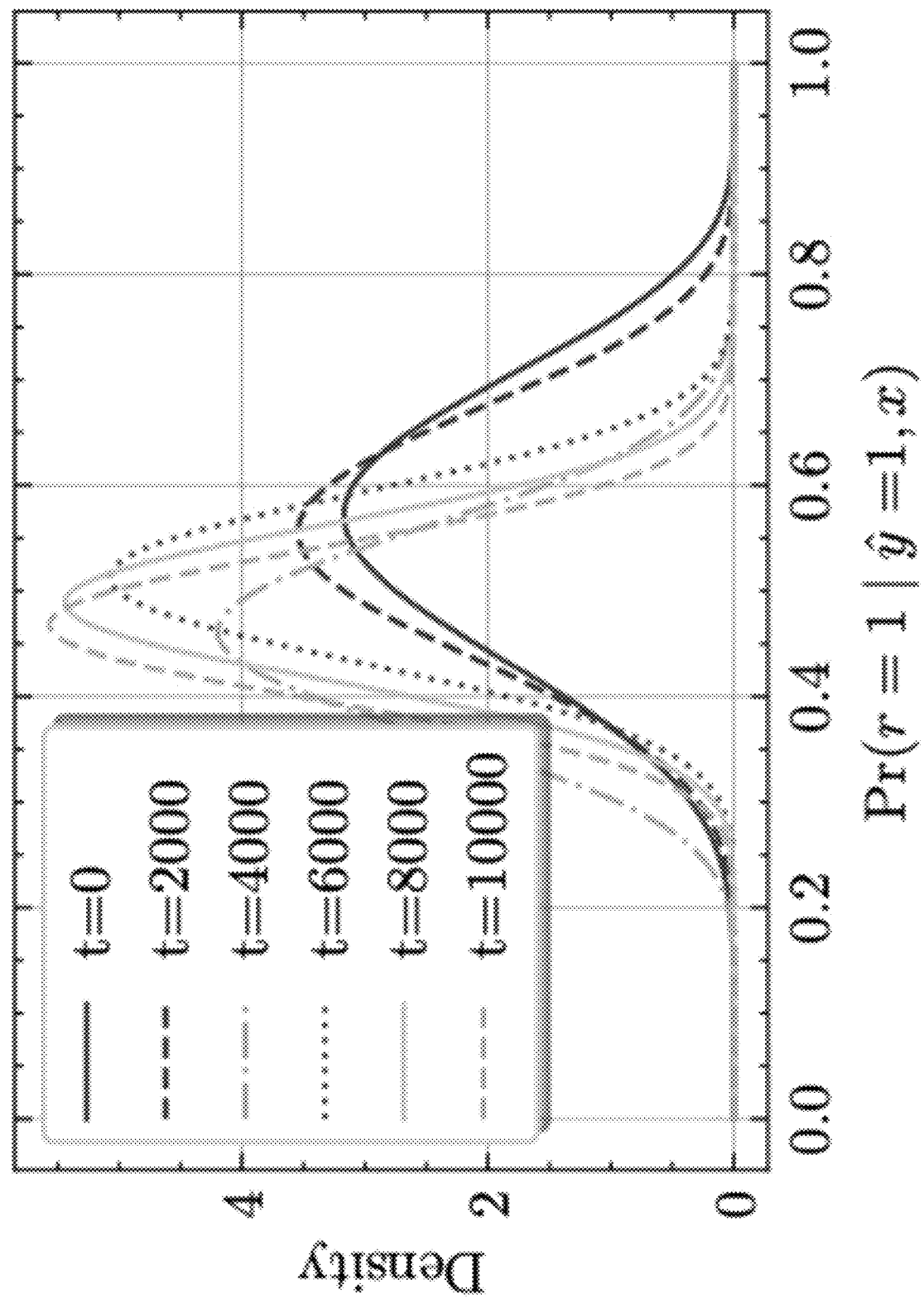
FIG. 11B is a graph illustrating the density of probability distribution for probability of reward is 1 by given status prediction is 1 for medium occurrence weather events, according to embodiments of the present disclosure.

FIG. 11B is a graph illustrating the density of probability distribution for probability of reward is 1 by given status prediction is 1 for medium occurrence weather events, according to embodiments of the present disclosure.

Figure 11C:
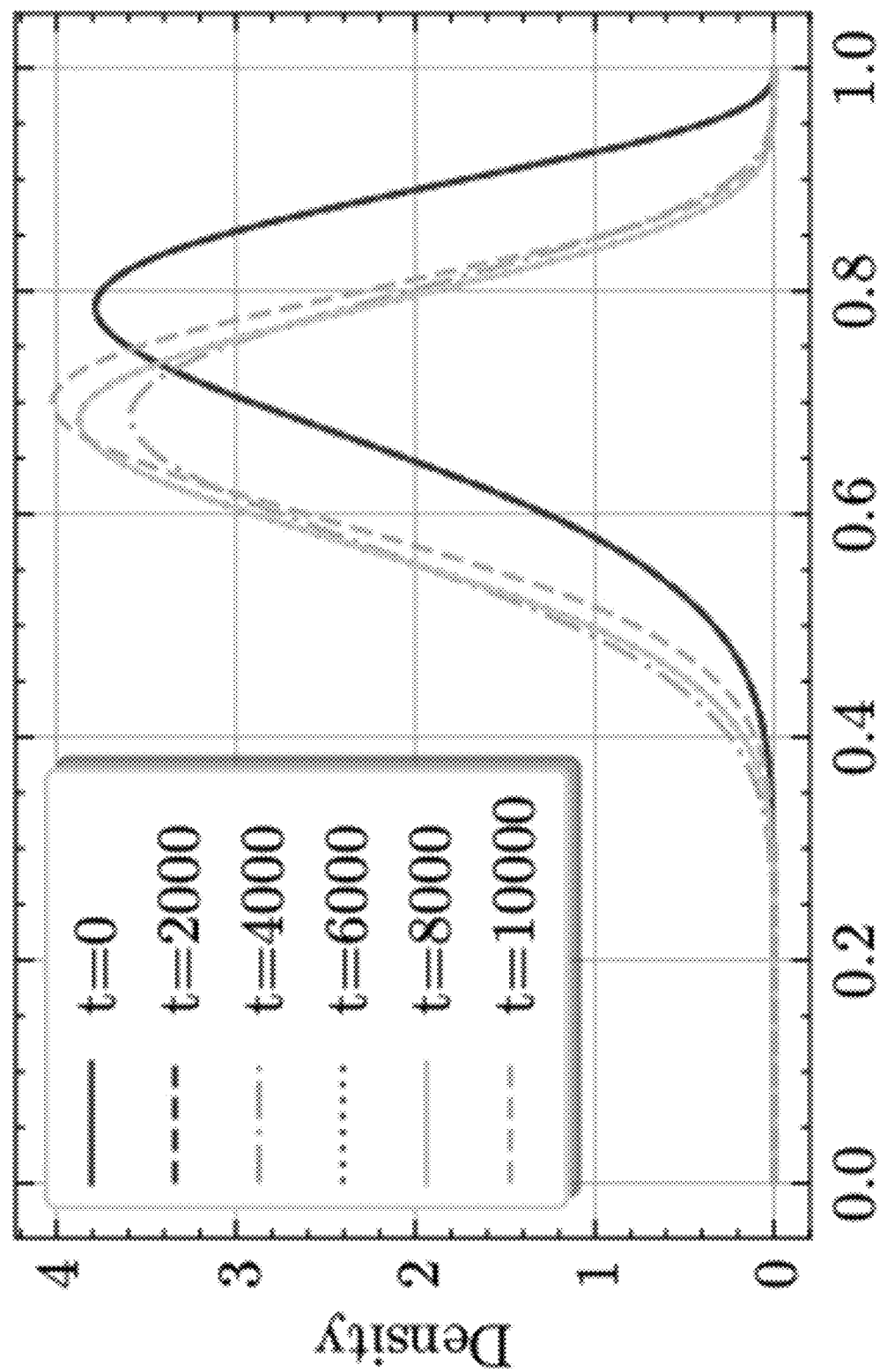
FIG. 11C is a graph illustrating the density of probability distribution for probability of reward is 1 by given status prediction is 1 for low occurrence weather events, according to embodiments of the present disclosure.

FIG. 11C is a graph illustrating the density of probability distribution for probability of reward is 1 by given status prediction is 1 for low occurrence weather events, according to embodiments of the present disclosure.

Three representative weather block is selected: high occurrence weather events (FIG. 10A and FIG. 11A), medium occurrence weather events (FIG. 10B and FIG. 11B), low occurrence weather events (FIG. 10C and FIG. 11C). It can be observed that in the some weather blocks as the learning depth for an agent is increasing, the distribution of the parameters will concentrate around some point, which demonstrate the process of the revision of data distribution through the feedback reward signal. This is also a reason why "ts" can perform better by constantly learning to find the most possible optimal parameters.

The tests using simulation data has proven that both disclosed online failure forecasting algorithms can effectively evaluate the impact of the weather conditions on outages in the distribution system. Besides being able to online predict outage status with the light computational complexity, those two methods can also online update its knowledge for the next decision-making task utilizing the reported outage data. The test results also showed that the disclosed algorithms are effective for the positive and negative samples, i.e., the binary outage status. The Thompson sampling action selection strategy based on Algorithm 2 is the best compared with other strategies. And its embedded prior knowledge can help the exploration for the better learning performance.

Features

An aspect of the present disclosure can include that the region is within a service area of an electrical power system and includes a set of components related to overhead distribution lines of the electrical power system. Another aspect includes the region is within a service area of an electrical power system, and the components are overhead distribution lines of the electrical power system. Wherein the overhead distribution lines include: (a) poles; (b) mechanical and electronic components; (c) distribution transformers mounted along the pole of the overhead distribution lines; (d) protection devices; and (e) sensors installed on the overhead distribution lines.

Another aspect can include that the component data includes data received as the observed data and the stored data includes data for each component including one or a combination of: age; material type; designated type and design; mounting and support equipment; electrical equipment; vegetation rating; tree limb trimming rating; leaf rating; installation and maintenance logs; severe weather exposure logs; vegetation and tree growth and type ratings around overhead lines, and management reports. An aspect is that the weather data received as the observed data and the stored data includes data including one or a combination of: seasonal data; local regional weather; classifications of impending weather events as one of snow, ice, rain/flood, wind, thunderstorm/lightning, ambient air temperature, wildfire, hurricane, severe weather rating, severe storm rating, mixed events, before and after events and non-events.

According to aspects of the present disclosure, the conversion of the sets of weather variables into the tabular form includes a grid of weather cells of the region, each weather cell represents a unique climate variation of a relationship between the weather variables in the set of weather variables. Another aspect is that the ML model for a set of weather drivers for a given component is configured by setting parameters of pre-determined probability distribution for rewards of actions with initial values, wherein actions include predicting component status as no failure, and predicting component status as failure. Still another aspect is the ML model for a set of weather drivers for a given component is updated through updating the parameters of probability distribution for rewards of actions, and corresponding action value function for each action, wherein actions include predicting component status as no failure, and predicting component status as failure. Further, an aspect is a model forcing intensity group is defined as a combination of variation intervals for weather variables, wherein each variation interval represents a unique variation range for one of weather variables.

Another aspect of the present disclosure can include that the status of the given component at an impending time period t, upon receiving a set of observed, or forecasted weather conditions for the time t, $x_t$, is predicted by choosing an action under a weather condition represented by a weather tabular cell $(i,j)$, $x^{ij}$, between a first action and a second action, wherein the first action is to predict the component status at time t as in-service, i.e. $\hat{y}_t=0$, and the second action is to predict the component status at time t as failure, i.e. $\hat{y}_t=1$; wherein each action, $\hat{y}_t=y$ has an action value function $q^{ij}(y)$; wherein the action is chosen to maximize the action value function, $$\hat{y}_t = \operatorname*{argmax}_{y} q^{ij}(y).$$

An aspect is the action value function $q^{ij}(y)$ is defined as an expected reward for choosing the action, $\hat{y}_t=y$ under given weather representation $x^{ij}$, i.e.

$$q^{ij} := E[r_t|\hat{y}_t = y, x^{ij}];$$

wherein a reward for the period t, $r_t$ is defined based on the correctness of the prediction status $\hat{y}_t$ against an actual status $y_t$, $r_t=1-|\hat{y}_t-y_t|$, and the reward $r_t$ follows a Bernoulli distribution. Another aspect is further comprising choosing action $\hat{y}_t=y$ to maximize the action value function, arg max $q^{ij}(y)$, wherein the action value function for the action $\hat{y}_t=y$ at the time t, $q^{ij}(y)$ is approximated as a ratio of number of times that the action $\hat{y}_t=y$ has been chosen and rewarded a value with 1 prior to time t, $m_y^{ij}[t-1]$ over number of times the action has been chosen prior to time t, $$n_y^{ij}[t-1], q^{ij}(y) = \frac{m_y^{ij}[t-1]}{n_y^{ij}[t-1]}.$$

Further comprising an aspect choosing the action $\hat{y}_t=y$ either randomly between the first action, $\hat{y}_t=0$ and the second action, $\hat{y}_t=1$ with a pre-determined probability $\epsilon$, or maximizing the action value function, arg max $q^{ij}(y)$, wherein the action value function for the action $\hat{y}_t=y$ at the time t, $q^{ij}(y)$ is approximated as ratio of number of times that the action has been chosen and rewarded a value with 1 prior to time t, $m_y^{ij}[t-1]$ over number of times the action has been chosen prior to time t, $$n_y^{ij}[t-1], q^{ij}(y) = \frac{m_y^{ij}[t-1]}{n_y^{ij}[t-1]}.$$

Further comprising an aspect choosing action $\hat{y}_t=y$ to maximize the action value function, arg max $q^{ij}(y)$, wherein the action value function for the action $\hat{y}_t=y$ at the time t, $q^{ij}(y)$ is approximated as ratio of number of times that the action has been chosen and rewarded a value with 1 prior to time t, $m_y^{ij}[t-1]$ over number of times the action has been chosen prior to time t, $n_y^{ij}[t-1]$, plus an upper-confidence bound exploration term relating to inherent uncertainty of prediction accuracy, $$q^{ij}(y) = \frac{m_y^{ij}[t-1]}{n_y^{ij}[t-1]} + c\sqrt{\frac{\ln(t)}{n_y^{ij}[t-1]}};$$

wherein ln(t) is the natural logarithm of t, and c is a pre-determined positive number. Further comprising choosing action $\hat{y}_t=y$ to maximize the action value function, arg max $q^{ij}(y)$, wherein the action value function for the action $\hat{y}_t=y$ at the time t, $q^{ij}(y)$ is approximated as probability of a Beta distribution with parameters $\alpha_y^{ij}[t-1]$ and $\beta_y^{ij}[t-1]$, $q^{ij}(y)=\text{Beta}(\alpha_y^{ij}[t-1], \beta_y^{ij}[t-1])$. Another aspect is $\alpha_y^{ij}[t-1]$ is defined as number of times that the action $\hat{y}_t=y$ has been chosen and rewarded a value with 1 prior to time t, $\beta_y^{ij}[t-1]$ is defined as a number of times that the action $\hat{y}_t=y$ has been chosen and rewarded a value with 0 prior to time t. Another aspect is weather conditions $x_t$ includes a wind gust speed $x_t^w$ and a lightning stroke current $x_t^l$, $x_t=(x_t^w, x_t^l)$. Another aspect is a weather tabular representation $x^{ij}$ is determined by comparing the weather conditions $x_t$ against the stored weather data or historical weather data for the region; wherein the historical weather data includes a set of minimum, maximum wind gust speeds, $\underline{x}^w, \overline{x}^w$, and a set of minimum and maximum lightning currents, $\underline{x}^l, \overline{x}^l$. Another aspect is the region is represented as a table with $n_w$ rows corresponding to wind speeds and $n_l$ columns corresponding to lightning currents. Another aspect is the corresponding weather tabular representation for cell ij (the i-th row and the j-th column of the table, $1 \leq i \leq n_w$, $1 \leq j \leq n_l$), $x^{ij}$ is denoted by a set $$x^{ij} = \left[\underline{x}^w + \frac{\overline{x}^w - \underline{x}^w}{n_w}(i-1), \underline{x}^w + \frac{\overline{x}^w - \underline{x}^w}{n_w}i\right) \times$$

$$\left[\underline{x}^l + \frac{\overline{x}^l - \underline{x}^l}{n_l}(j-1), \underline{x}^l + \frac{\overline{x}^l - \underline{x}^l}{n_l}j\right).$$

Another aspect of the present disclosure can include a region that is a two-mile grid, 4-mile grid or 6-mile grid that includes the components within the service area by the electrical power system. Another aspect is that each weather cell is compared to a weather variable threshold to identify a grouping of weather cells meeting the threshold that accurately represent weather conditions scenarios in an area within the region.

Another aspect includes applications having programs, some programs can include an aspect having programs with instructions for changing a forecast model to accommodate local conditions as measured real-time by a local network of weather monitoring stations that provides comprehensive degrees of resolutions associated with a Supervisory Control and Data Acquisition system of an electrical power company, that by selecting parameterization schemes based on the received local conditions as measured real-time by the local network and based on the differences between predicted conditions and local conditions as measured. Another aspect can include programs with instructions for presenting a user interface to allow modification data by the user to modify results of the forecast model based on data conditions known by an operator and trend data. Another aspect can be programs with instructions for initializing lateral boundary conditions based on larger scale numerical weather forecast data and lower boundary conditions based on climatological geographic data for a domain of the forecast model.

Figure 12:
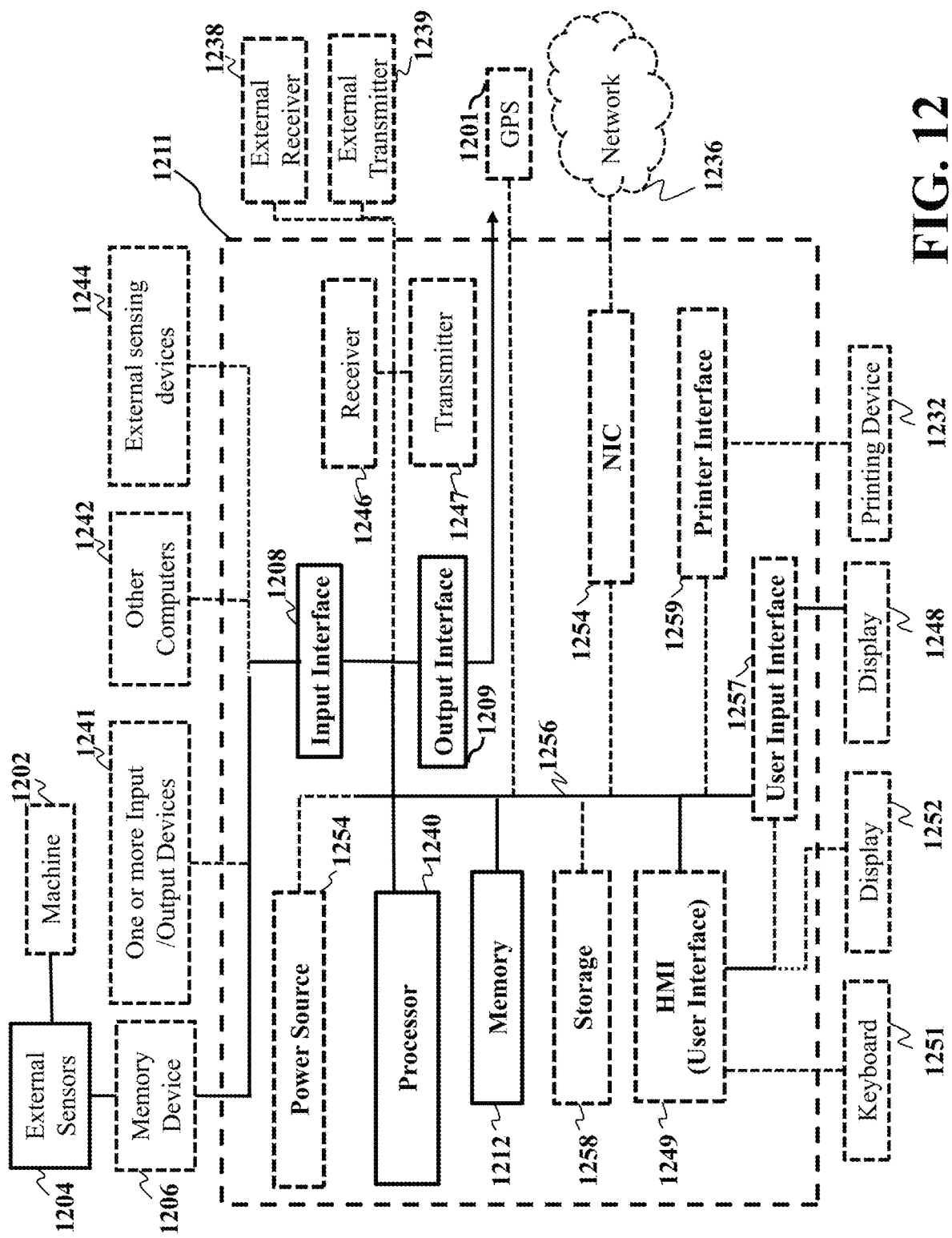
FIG. 12 is a block diagram illustrating the methods of FIG. 1A and FIG. 1B, that can be implemented using an alternate computer or processor, according to embodiments of the present disclosure.

FIG. 12 is a block diagram illustrating the methods of FIG. 1A and FIG. 1B, that that can be implemented using an alternate computer or hardware processor, according to embodiments of the present disclosure. The computer 1211 includes a hardware processor 1240, computer readable memory 1212, storage 1258 and user interface 1249 with display 1252 and keyboard 1251, which are connected through bus 1256. For example, the user interface 1257 in communication with the hardware processor 1240 and the computer readable memory 1212, acquires and stores the signal data examples in the computer readable memory 1212 upon receiving an input from a surface, keyboard surface 1257, of the user interface 1257 by a user.

The computer 1211 can include a power source 1254, depending upon the application the power source 1254 may be optionally located outside of the computer 1211. Linked through bus 1256 can be a user input interface 1257 adapted to connect to a display device 1248, wherein the display device 1248 can include a computer monitor, camera, television, projector, or mobile device, among others. A printer interface 1259 can also be connected through bus 1256 and adapted to connect to a printing device 1232, wherein the printing device 1232 can include a liquid inkjet printer, solid ink printer, large-scale commercial printer, thermal printer, UV printer, or dye-sublimation printer, among others. A network interface controller (NIC) 1254 is adapted to connect through the bus 1256 to a network 1236, wherein time series data or other data, among other things, can be rendered on a third-party display device, third-party imaging device, and/or third-party printing device outside of the computer 1211.

Still referring to FIG. 12, the signal data or other data, among other things, can be transmitted over a communication channel of the network 1236, and/or stored within the storage system 1258 for storage and/or further processing. Contemplated is that the signal data could be initially stored in an external memory and later acquired by the hardware processor to be processed or store the signal data in the hardware processor's memory to be processed at some later time. The hardware processor memory includes stored executable programs executable by the hardware processor or a computer for performing the component failure prediction systems/methods, power distribution system operation data, and historical power distribution system data of the same type as the power distribution system and other data relating to the component failure prediction of the power distribution system or similar types of power distribution systems as the power distribution system.

Further, the signal data or other data may be received wirelessly or hard wired from a receiver 1246 (or external receiver 1238) or transmitted via a transmitter 1247 (or external transmitter 1239) wirelessly or hard wired, the receiver 1246 and transmitter 1247 are both connected through the bus 1256. The computer 1211 may be connected via an input interface 1208 to external sensing devices 1244 and external input/output devices 1241. For example, the external sensing devices 1244 may include sensors gathering data before-during-after of the collected signal data of the power distribution system. For instance, the failure line segments, failure times, and the failure impacted customers. The computer 1211 may be connected to other external computers 1242. An output interface 1209 may be used to output the processed data from the hardware processor 1240. It is noted that a user interface 1249 in communication with the hardware processor 1240 and the non-transitory computer readable storage medium 1212, acquires and stores the region data in the non-transitory computer readable storage medium 1212 upon receiving an input from a surface 1252 of the user interface 1249 by a user. The Bus 1256 can also connect other devices and interfaces, such as GPS 1201, printer interface 1259, and through input interface 1208 with memory device 1206, and further with external sensors 1204, and machines 1202.

Definitions

Power grid: and electrical grid, reference a same definition, in this application. A power grid is an interconnected network for delivering electricity from one location to another location, such as from a power producer to a power consumer. The power grid can consist of generating stations that produce electrical power, high voltage transmission lines that carry power from distant sources to demand centers, and distribution lines that connect to consumers of the power, such as customers. For example, a power grid or distribution grid may include one or more premises, such as homes, businesses or facilities, including devices that consume electricity or power, and energy resources that provide electricity or power such as generators and renewable energies.

Power loads: can be an electrical load is an electrical component or portion of a circuit that consumes (active) electric power. This is opposed to a power source, such as a battery or generator, which produces power. In electric power circuits examples of loads are appliances and lights. Loads may be further classified as critical loads and non-critical loads.

Critical loads: can require a substantially continuous supply of power and are thus deemed "critical loads". Examples of some critical loads include computers, control devices employing computers, and/or electronic data processing devices. Regarding the critical loads and continuous supply of power, mere brief interruptions in a standardized supply of electric power by the utility grid may cause, for example, a computer to malfunction, which sometimes can be costly, as well as substantial consequences. Non-critical loads: can be defined as all loads which are not labeled as critical loads. Non-critical loads usually do not require a substantially continuous supply of power and can be shed off if there is a generation shortage or restored after the critical loads are restored. Fault isolation: refers to a process that after a failed component is identified, it will be isolated from other healthy components, then those components can be re-energized to restore the power supply if possible.

Operational resilience: can be defined as the ability of power distribution systems as a whole to absorb and adapt to disasters, rather than contribute to them. It goes beyond traditional operational risk and recovery capabilities, with a focus on preserving the continuity of the provision of "critical functions" to both the distribution system and to the system's customers.

Infrastructure resilience: refers to the resilience of hardware, such as power towers, substation structure, and power wires.

Event: is considered some action that caused damage to at least a portion of the power grid, resulting in a potential of, a destabilization of or loss of, power in the power distribution network, which causes an interruption of suppling continuous power either immediately or sometime in a near future. Some examples of events may be considered as natural disaster event (weather, earthquake, etc.), an intentional damaging event (terrorist attack, etc.) or an unintentional damaging event (plane crash, train wreck, etc.).

Restoration: refers to a process to bring partial or whole power distribution system back to normal service after an extreme event occurs and results power outages in partial or whole system. Service restoration: refers to restore normal power supply for customers. Infrastructure recovery: refers to the recovery of damaged hardware, such as power poles, substation transformer, and power wires. Information network: is one of a wide area network, the Internet or both.

Condition information: from devices may include device energized status, device damage/disconnected status, terminal voltages, and power flows. For example, a current condition information received from the devices can be updated condition information for that moment in time the condition information is received or obtained.

Historical data: refers to the power distribution grid data acquired before the extreme event occurs. For example, the data can include locations, times, types of weather event associated with component failures, weather data and geographic data associated with each component reported failure and standard operation, third party reported historical data associated with weather, geographic locations and terrain associated with outages and not associated with outages. Maintenance, replacement, management past decisions, customer reported concerns during outages and at normal operation times without outages. Any data associated with operating the power distribution grid, including components, weather, terrain, third party reporting data of the power distribution grid, status and reliability of communication networks, etc.

Power distribution grid data: Can include a topology of the power distribution grid that incorporates identifying locations of the micro-grids and the one or more loads, along with labeling the one or more loads as the subset of critical loads and the subset of non-critical loads.

Power disruption: Can be a power outage or power failures in the power distribution network. Examples of some causes of power failures can include faults at power stations, damage to electric transmission lines, substations or other parts of the distribution system, a short circuit, or the overloading of electricity mains. Specifically, a power outage can be a short or long-term state of electric power loss in a given area or section of a power grid, that could affect a single house, building or an entire city, depending on the extent of the damage or cause of the outage.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks. Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A prediction system for a region, comprising:
a component prediction processor configured to
receive, from data storage, data including weather and component data for regions, and generate a dataset for the region to identify weather events with components locations, each weather event includes parameters, and sets of weather variables converted into tabular form;
generate sets of weather drivers, each set of weather drivers include a given set of weather variables, and configure a machine learning (ML) model for each set of weather drivers for each component in the region using the dataset;
iteratively, for each weather event in the region:
identify for each component a corresponding set of weather drivers with weather variables including wind gust speeds and lightning stroke currents, and generate an output value for the ML model corresponding to the identified components to the set of weather variables, and update the ML model with the output value and with the component data for the weather event;
receive real-time observed data over time periods via a communication network of an impending weather (IW) event in the region, and iteratively, for each time period;
identify, for each component a same corresponding set of weather drivers with weather variables, and update the ML model that corresponds the identified components to the sets of weather variables using a last executed iteration predicted output value for the component, and the observed data of the IW event; and
generate for the updated ML model, an output value predicting a component status as a failed or not failed for the time period.

2. The prediction system of claim 1, wherein the region is within a service area of an electrical power system, and the components are overhead distribution lines of the electrical power system.

3. The prediction system of claim 2, wherein the overhead distribution lines include: (a) poles; (b) mechanical and electronic components; (c) distribution transformers mounted along the pole of the overhead distribution lines; (d) protection devices; and (e) sensors installed on the overhead distribution lines.

4. The prediction system of claim 1, wherein the component data received as the observed data and the stored data includes data for each component including geographical data and one or a combination of: age; material type; designated type and design; mounting and support equipment; electrical equipment; vegetation rating; tree limb trimming rating; leaf rating; installation and maintenance logs; severe weather exposure logs; vegetation and tree growth and type ratings around overhead lines, and management reports.

5. The prediction system of claim 1, wherein the weather data received as the observed data and the stored data include data of one or a combination of: seasonal data; local regional weather; classifications of impending weather events as one of snow, ice, rain/flood, wind, thunderstorm/lightning, ambient air temperature, wildfire, hurricane, severe weather rating, severe storm rating, mixed events; non-event weather data; and the stored data includes before and after weather events and non-event weather events.

6. The prediction system of claim 1, wherein the conversion of the sets of weather variables into the tabular form includes a grid of weather cells of the region, each weather cell represents a unique climate variation of a relationship between the weather variables in the set of weather variables.

7. The prediction system of claim 1, wherein the ML model for a set of weather drivers for a given component is configured by setting parameters of pre-determined probability distribution for rewards of actions with initial values, wherein actions include predicting component status as failed or not failed.

8. The prediction system of claim 1, wherein the ML model for a set of weather drivers for a given component is updated through updating the parameters of probability distribution for rewards of actions, and corresponding action value function for each action, wherein actions include predicting component status as failed or not failed.

9. The prediction system of claim 1, wherein the status of the given component at an impending time period t, upon receiving a set of observed, or forecasted weather conditions for the time t, $x_t$, is predicted by choosing an action under a weather condition represented by a weather tabular cell (i,j), $x^{ij}$, between a first action and a second action, wherein the first action is to predict the component status at time t as in-service, i.e. $\hat{y}_t=0$, and the second action is to predict the component status at time t as failure, i.e. $\hat{y}_t=1$; wherein each action, $\hat{y}_t=y$ has an action value function $q^{ij}(y)$; wherein the action is chosen to maximize the action value function, $$\hat{y}_t = \underset{y}{\mathrm{argmax}}\, q^{ij}(y).$$

10. The prediction system of claim 9, wherein the action value function $q^{ij}(y)$ is defined as an expected reward for choosing the action, $\hat{y}_t=y$ under given weather representation $x^{ij}$, i.e.

$$q^{ij} := E[r_t | \hat{y}_t = y, x^{ij}];$$

wherein a reward for the period t, $r_t$ is defined based on the correctness of the prediction status $\hat{y}_t$ against an actual status $y_t$, $r_t = 1 - |\hat{y}_t - y_t|$, and the reward $r_t$ follows a Bernoulli distribution.

11. The prediction system of claim 9, wherein further comprising choosing action $\hat{y}_t=y$ to maximize the action value function, arg max $q^{ij}(y)$, wherein the action value function for the action $\hat{y}_t=y$ at the time t, $q^{ij}(y)$ is approximated as a ratio of number of times that the action $\hat{y}_t=y$ has been chosen and rewarded a value with 1 prior to time t, $m_y^{ij}[t-1]$ over number of times the action has been chosen prior to time t, $$n_y^{ij}[t-1],\, q^{ij}(y) = \frac{m_y^{ij}[t-1]}{n_y^{ij}[t-1]}.$$

12. The prediction system of claim 9, further comprising choosing the action $\hat{y}_t=y$ either randomly between the first action, $\hat{y}_t=0$ and the second action, $\hat{y}_t=1$ with a pre-determined probability $\epsilon$, or maximizing the action value function, arg max $q^{ij}(y)$, wherein the action value function for the action $\hat{y}_t=y$ at the time t, $q^{ij}(y)$ is approximated as ratio of number of times that the action has been chosen and rewarded a value with 1 prior to time t, $m_y^{ij}[t-1]$ over number of times the action has been chosen prior to time t, $$n_y^{ij}[t-1],\, q^{ij}(y) = \frac{m_y^{ij}[t-1]}{n_y^{ij}[t-1]}.$$

13. The prediction system of claim 9, further comprising choosing action $\hat{y}_t=y$ to maximize the action value function, arg max $q^{ij}(y)$, wherein the action value function for the action $\hat{y}_t=y$ at the time t, $q^{ij}(y)$ is approximated as ratio of number of times that the action has been chosen and rewarded a value with 1 prior to time t, $m_y^{ij}[t-1]$ over number of times the action has been chosen prior to time t, $n_y^{ij}[t-1]$, plus an upper-confidence bound exploration term relating to inherent uncertainty of prediction accuracy, $$q^{ij}(y) = \frac{m_y^{ij}[t-1]}{n_y^{ij}[t-1]} + c\sqrt{\frac{\ln(t)}{n_y^{ij}[t-1]}};$$

wherein ln(t) is the natural logarithm of t, and c is a pre-determined positive number.

14. The prediction system of claim 9, further comprising choosing action $\hat{y}_t=y$ to maximize the action value function, arg max $q^{ij}(y)$, wherein the action value function for the action $\hat{y}_t=y$ at the time t, $q^{ij}(y)$ is approximated as probability of a Beta distribution with parameters $\alpha_y^{ij}[t-1]$ and $\beta_y^{ij}[t-1]$, $q^{ij}(y)=\mathrm{Beta}(\alpha_y^{ij}[t-1],\beta_y^{ij}[t-1])$; wherein $\alpha_y^{ij}[t-1]$ is defined as number of times that the action $\hat{y}_t=y$ has been chosen and rewarded a value with 1 prior to time t, $\beta_y^{ij}[t-1]$ is defined as a number of times that the action $\hat{y}_t=y$ has been chosen and rewarded a value with 0 prior to time t.

15. The prediction system of claim 9, wherein weather conditions $x_t$ includes a wind gust speed $x_t^w$ and a lightning stroke current $x_t^l$, $x_t=(x_t^w,x_t^l)$; wherein a weather tabular representation $x^{ij}$ is determined by comparing the weather conditions $x_t$ against the stored weather data or historical weather data for the region; wherein the historical weather data includes a set of minimum, maximum wind gust speeds, $\underline{x}^w,\overline{x}^w$, and a set of minimum and maximum lightning currents, $\underline{x}^l,\overline{x}^l$; wherein the region is represented as a table with $n_w$ rows corresponding to wind speeds and $n_l$ columns corresponding to lightning currents; wherein the corresponding weather tabular representation for cell ij (the i-th row and the j-th column of the table, $1 \leq i \leq n_w$, $1 \leq j \leq n_l$), $x^{ij}$ is denoted by a set $$x^{ij} = \left[\underline{x}^w + \frac{\overline{x}^w - \underline{x}^w}{n_w}(i-1), \underline{x}^w + \frac{\overline{x}^w - \underline{x}^w}{n_w}i\right) \times \left[\underline{x}^l + \frac{\overline{x}^l - \underline{x}^l}{n_l}(j-1), \underline{x}^l + \frac{\overline{x}^l - \underline{x}^l}{n_l}j\right).$$

16. The prediction system of claim 1, wherein each weather cell is compared to a weather variable threshold to identify a grouping of weather cells meeting the threshold that accurately represent weather conditions scenarios in an area within the region.

17. A prediction method for components in a region, comprising:

accessing data including weather and component data for regions, and generate a dataset for the region to identify weather events with components locations, each weather event includes parameters, and sets of weather variables converted into tabular form representing grids of weather cells of the region;

generating sets of weather drivers, each set of weather drivers includes a given set of weather variables;

configuring a machine learning (ML) model for each set of weather drivers for each component in the region using the dataset, and iteratively, for each weather event in the region:

identifying for each component a corresponding set of weather drivers with weather variables including wind gust speeds and lightning stroke currents, and generate an output value for the ML model corresponding to the identified components to the set of weather variables, and update the ML model with the output value and with the component data for the weather event;

receiving real-time observed data over time periods of an impending weather (IW) event in the region, and iteratively, for each time period;

identifying, for each component a corresponding set of weather drivers with weather variables including wind gust speeds and lightning stroke currents, and update the ML model that corresponds the identified components to the sets of weather variables using a last executed iteration predicted output value for the component, and the observed data of the IW event; and generating for the updated ML model, an output value predicting a component status as a failed or not failed for the time period.

18. A computer program product for predicting an overhead power line status of a power grid system in a region, the computer program product comprising:

one or more computer-readable storage mediums;

program instructions, stored on at least one of the one or more computer-readable storage mediums, to:

(a) receive, from data storage, data including weather and component data for regions, and generate a dataset for the region to identify weather events with components locations, each weather event includes parameters, and sets of weather variables converted into tabular form representing grids of weather cells of the region;

(b) generate sets of weather drivers, each set of weather drivers include a given set of weather variables, and configure a machine learning (ML) model for each set of weather drivers for each component in the region using the dataset, and iteratively, for each weather event in the region:

(c) identify for each component a corresponding set of weather drivers with weather variables including wind gust speeds and lightning stroke currents, and d) generate an output value for the ML model corresponding to the identified components to the set of weather variables, and update the ML model with the output value and with the component data for the weather event;

program instructions, stored on at least one of the one or more computer-readable storage mediums, to:

(a) receive real-time observed data over time periods via a communication network of an impending weather (IW) event in the region, and iteratively, for each time period;

(b) identify, from the observed data, the corresponding component and model forcing group of the IW event;

(c) identify, for each component a corresponding set of weather drivers with weather variables including wind gust speeds and lightning stroke currents, and update the ML model that corresponds the identified components to the sets of weather variables using a last executed iteration predicted output value for the component, and the observed data of the IW event; and (d) generate for the updated ML model, an output value predicting a component status as a failed or not failed for the time period.

19. A prediction system for components in a region, comprising:

a prediction processor configured to receive from a memory weather and component data for regions;

generate a dataset for the region to identify parameters for weather events with components locations, and generate sets of weather drivers, each set of weather drivers includes a given set of weather variables converted into tabular form representing grids of weather cells configured to accurately represent weather conditions scenarios in the region;

configure a machine learning (ML) model for each set of weather drivers for each component using the dataset, and iteratively, for each weather event:

identify for each component a corresponding set of weather drivers with weather variables, and generate an output value for the ML model corresponding to the identified components to the set of weather variables, and update the ML model with the output value and with the component data for the weather event;

receive real-time observed data over time periods via a communication network of an impending weather (IW) event in the region, and iteratively, for each time period;

identify, for each component a corresponding set of weather drivers with weather variables, and update the ML model corresponding to the identified components to the sets of weather variables using a last executed iteration predicted output value for the component, and the observed data of the IW event, and generate for the updated ML model, an output value predicting a component status as a failed or not failed for the time period.

20. The prediction system of claim 18, wherein the components include one or a combination of: power grid overhead distribution lines; power grid components; telephone poles; telephone components; or construction project components including one or a combination of walls, forms, roof coverings, structural framework.

\* \* \* \* \*